United States Patent
Moon et al.

(10) Patent No.: US 11,665,781 B2
(45) Date of Patent: May 30, 2023

(54) APPARATUS AND METHOD FOR TRANSMITTING BRIDGE MANAGEMENT INFORMATION IN WIRELESS COMMUNICATION SYSTEM

(71) Applicant: Samsung Electronics Co., Ltd., Suwon-si (KR)

(72) Inventors: Sangjun Moon, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/226,499

(22) Filed: Apr. 9, 2021

(65) Prior Publication Data

US 2021/0321487 A1 Oct. 14, 2021

(30) Foreign Application Priority Data

Apr. 9, 2020 (KR) .................. 10-2020-0043583

(51) Int. Cl.
*H04W 88/16* (2009.01)
*H04W 8/10* (2009.01)
(Continued)

(52) U.S. Cl.
CPC ............ *H04W 88/16* (2013.01); *H04W 8/10* (2013.01); *H04W 76/11* (2018.02); *H04W 76/12* (2018.02)

(58) Field of Classification Search
CPC ..... H04W 88/16; H04W 76/12; H04W 76/11; H04W 8/10
See application file for complete search history.

(56) References Cited

U.S. PATENT DOCUMENTS

| 2019/0289616 | A1 | 9/2019 | Hampel et al. | |
| 2022/0131720 | A1* | 4/2022 | Ke | H04L 47/286 |
| 2022/0182896 | A1* | 6/2022 | Talebi Fard | H04W 36/0085 |

FOREIGN PATENT DOCUMENTS

| CN | 111818666 A | * 10/2020 | ........... H04L 12/462 |
| KR | 10-2019-0017663 A | 2/2019 | |

(Continued)

OTHER PUBLICATIONS

Intel, "Correction to TSN configuration call flows to include NEF", S2-2002672, SA WG2 Meeting #S2-138E, Electronic meeting, Apr. 1, 2020.

(Continued)

*Primary Examiner* — Saad A. Waqas
(74) *Attorney, Agent, or Firm* — Jefferson IP Law, LLP

(57) ABSTRACT

The disclosure relates to a $5^{th}$ generation (5G) or pre-5G communication system for supporting a higher data transmission rate than a 4G communication system such as LTE. An operating method of a network node in a wireless communication system is provided. The method includes receiving, from a session management function (SMF), information on at least one device side TSN translator port (DS-TT port) number of at least one DS-TT port for at least one packet data unit (PDU) session, generating at least one of a port management information container and a bridge management information container based on the at least one DS-TT port number, and transmitting, to a centralized network controller (CNC), the at least one of the port management information container and the bridge management information container.

10 Claims, 18 Drawing Sheets

| Information | Associated session | Session independency | Data policy transmission |
|---|---|---|---|
| A | 1 | O / X | 1 |
| B | 1, 2 | X | 1 and 2 |
| C | 1, 2 | O | 1 or 2 |

(51) Int. Cl.
*H04W 76/12* (2018.01)
*H04W 76/11* (2018.01)

(56) References Cited

FOREIGN PATENT DOCUMENTS

| KR | 20220018555 A | * | 2/2022 | ............ H04W 76/11 |
|----|---------------|---|--------|-------------------------|
| WO | 2020/035130 A1 |  | 2/2020 | |
| WO | 2020/036911 A1 |  | 2/2020 | |
| WO | WO-2021094236 A1 | * | 5/2021 | ............. H04L 67/14 |

OTHER PUBLICATIONS

Intel, "Correction to transfer of port management information to include NEF", S2-2002671, SA WG2 Meeting #S2-138E, Electronic meeting, Apr. 1, 2020.

International Search Report and Written Opinion dated Jul. 15, 2021, issued in International Patent Application No. PCT/KR2021/004534.

* cited by examiner

| Information | Associated session | Session independency | Data policy transmission |
|---|---|---|---|
| A | 1 | O / X | 1 |
| B | 1, 2 | X | 1 and 2 |
| C | 1, 2 | O | 1 or 2 |

FIG.7

○ PDU session mapping

APPARATUS AND METHOD FOR TRANSMITTING BRIDGE MANAGEMENT INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0043583, filed on Apr. 9, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for transmitting bridge management information in a wireless communication system.

2. Description of the Related Art

Efforts to develop enhanced $5^{th}$ generation (5G) communication systems or pre-5G communication systems have been ongoing in order to meet the increasing demand for wireless data traffic since $4^{th}$ generation (4G) communication systems were commercialized. For this reason, the 5G communication systems or pre-5G communication systems are called Beyond 4G network communication systems or post long term evolution (LTE) systems.

The 5G communication system is considered to be implemented in a super high frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the super high frequency band.

In addition, technologies for evolved small cells, enhanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA) which are enhanced accessing technology in the 5G systems are developing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for transmitting bridge management information in a wireless communication system.

Additional aspects will be set forth in part in the description which follows and, in part, will be apparent from the description, or may be learned by practice of the presented embodiments.

In accordance with an aspect of the disclosure, an operating method of a network node is provided. The method includes establishing a protocol data unit (PDU) session for a terminal, receiving information regarding the PDU session from a device side time sensitive networking (TSN) translator (DS-TT) and a network side TSN translator (NW-TT) of the terminal, transmitting a link layer discovery protocol (LLDP) configuration to the DS-TT and the NW-TT, receiving LLDP result information from the DS-TT and the NW-TT, and, based on the LLDP result information, registering or updating bridge management information including information of the DS-TT and the NW-TT at a TSN control plane (CP).

In accordance with another aspect of the disclosure, a network node in a wireless communication system is provided. The network node includes a transceiver, and at least one processor, and the at least one processor is configured to establish a PDU session for a terminal, receive information regarding the PDU session from a DS-TT and an NW-TT of the terminal, transmit an LLDP configuration to the DS-TT and the NW-TT, receive LLDP result information from the DS-TT and the NW-TT, and, based on the LLDP result information, register or update bridge management information including information of the DS-TT and the NW-TT at a TSN CP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a view illustrating a management table for PDU session mapping for information in a wireless communication system according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, hardware-wise approach methods will be described by way of an example. However, various embodiments of the disclosure include technology using both hardware and software, and thus do not exclude software-based approach methods.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same technical meanings may be used.

As used herein, terms for identifying connection nodes, terms indicating network entities or network functions (NFs), terms indicating messages, terms indicating an interface between network entities, terms indicating a variety of identification information are merely examples for convenience of explanation. Accordingly, the disclosure is not limited to the terms described below, and other terms indicating objects having the same technical meanings may be used.

In addition, the disclosure describes various embodiments by using terms used in some communication standards (for example, 3rd generation partnership project (3GPP)), but these embodiments are merely examples. Various embodiments of the disclosure may be easily modified and applied to other communication systems.

Figure 1:
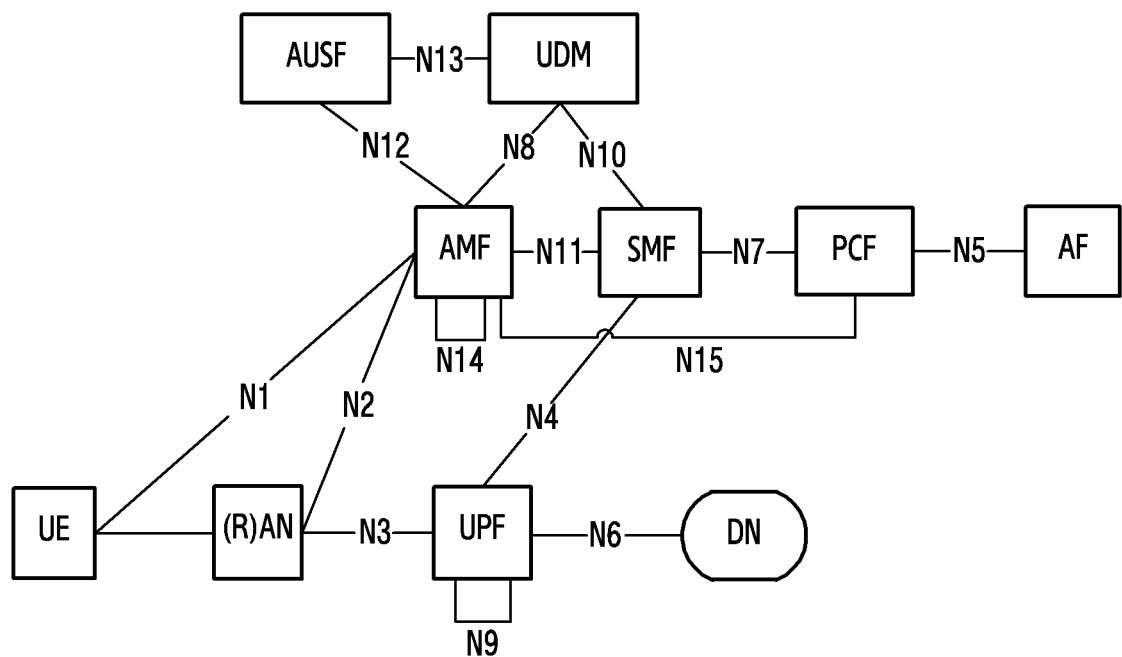
FIG. 1 is a view illustrating an example of a 5G system architecture using reference point expressions in a wireless communication system according to an embodiments of the disclosure.

FIG. 1 illustrates an example of a 5G system architecture using reference point expressions in a wireless communication system according to an embodiments of the disclosure.

Referring to FIG. 1, the 5G system architecture may include various components (that is, network functions (NFs)), and FIG. 1 illustrates some of the components, for example, an authentication server function (AUSF), a (core) access and mobility management function (AMF), a session management function (SMF), a policy control function (PCF), an application function (AF), unified data management (UDM), a data network (DN), a user plane function (UPF), a (radio) access network ((R) AN), a terminal, that is, user equipment (UE).

The respective NFs support the following functions.

The AUSF stores data for authentication of UE.

The AMF provides a function for access and mobility management on a UE basis, and one UE is basically connected to one AMF.

Specifically, the AMF supports functions such as signaling between CN nodes for mobility between 3GPP access networks, termination of a radio access network (RAN) CP interface (that is, an N2 interface), termination of NAS signaling (N1), NAS signaling security (NAS ciphering and integrity protection), AS security control, registration management (registration area management), connection management, idle mode UE reachability (including control and performance of paging retransmission), mobility management control (subscription and policy), intra-system mobility and inter-system mobility support, support for network slicing, SMF selection, lawful intercept (regarding an AMF event and an interface to an LI system), provision of transmission of a session management (SM) message between UE and an SMF, transparent proxy for routing an SM message, access authentication, access authorization including roaming authority check, provision of transmission of an SMS message between UE and an SMSF, security anchor function (SAF) and/or security context management (SCM).

Some or all of the AMFs may be supported within a single instance of one AMF.

The DN refers to, for example, an operator service, Internet access or a third party service. The DN may transmit a downlink protocol data unit (PDU) to the UPF, or may receive a PDU transmitted from the UE from the UPF.

The PCF provides a function of receiving information on a packet flow from an application server, and determining a policy such as mobility management, session management, etc. Specifically, the PCF may support functions such as support for a unified policy framework to control network operations, provision of policy rules for CP function(s) (for example, AMF, SMF) to conduct policy rules, implementation of a front end to access subscription information related to determination of a policy within a user data repository (UDR).

The SMF may provide a session management function, and, when UE has a plurality of sessions, the sessions may be managed by different SMFs.

Specifically, the SMF may support functions such as session management (for example, establishment, modification, and cancellation of a session including tunnel maintenance between a UPF and an node), allocation and management of a UE IP address (selectively including authentication), selection and control of a UP function, configuration of traffic steering for routing traffic to an appropriate destination in the UPF, termination of an interface toward policy control functions, performance of control part of policy and quality of service (QoS), lawful intercept (regarding an SM event and an interface to an LI system), termination of an SM part of an NAS message, downlink data notification, an initiator of AN specific SM information (transmission to the AN through N2 via the AMF), determination of an SSC mode of a session, a roaming function, etc.

Some or all of the SMFs may be supported within a single instance of one SMF.

The UDM stores subscription data of a user, policy data. The UDM includes two parts, that is, an application front end (FE) and a user data repository (UDR).

The FE includes a UDM FE which takes charge of location management, subscription management, processing of credential, and a PCF which takes charge of policy control. The UDR stores data required for functions provided by the UDM-FE, and a policy profile required by the PCF. Data stored in the UDR includes user subscription data including a subscriber identifier, security credential, access and mobility-related subscription data, and session-related subscription data, and policy data. The UDM-FE accesses the subscription information stored in the UDR, and supports functions such as authentication credential processing, user identification handling, access authentication, registration/mobility management, subscription management, SMS management, etc.

The UPF may transmit a downlink PDU received from the DN to the UE via the (R) AN, and may transmit an uplink PDU received from the UE via the (R) AN to the DN.

Specifically, the UPF supports functions such as an anchor point for intra/inter RAT mobility, an external PDU session point of interconnection with a data network, packet routing and forwarding, a user plane part for execution of packet inspection and policy rules, lawful intercept, traffic usage reporting, an uplink classifier for supporting routing of a traffic flow to a data network, a branching point for supporting a multi-homed PDU session, QoS handling for a user plane (for example, packet filtering, gating, uplink/downlink rate performance), uplink traffic verification (service data flow (SDF) mapping between an SDF and a QoS flow), transport level packet marking within an uplink and a downlink, downlink packet buffering, and downlink data notification triggering. Some or all of the UPFs may be supported within a single instance of one UPF.

The AF interacts with a 3GPP core network to provide a service (for example, an application effect on traffic routing, network capability exposure access, and/or support for a function of interacting with a policy framework for policy control).

The (R) AN refers to a new radio access network supporting both evolved universal mobile telecommunications system (UMTS) terrestrial radio access (E-UTRA) which is an evolved version of 4G radio access technology, and new radio access technology (new radio (NR)) (for example, gNB).

The gNB supports functions such as functions for managing radio resources (that is, radio bearer control, radio admission control, connection mobility control, dynamic allocation of resources to UE in an uplink/downlink (that is, scheduling)), internet protocol (IP) header compression, encryption of a user data stream and integrity protection, selection of the AMF when UE is attached if routing to the AMF is not determined from information provided to the UE, user plane data routing to UPF(s), control plane information routing to the AMF, connection setup and cancellation, scheduling and transmission of a paging message (generated from the AMF), scheduling and transmission of system broadcast information (generated from the AMF or operating and maintenance (O&M)), measurement for mobility and scheduling and configuration of a measurement report, transport level packing marking in an uplink, session management, support for network slicing, QoS flow management and mapping to data radio bearer, support for UE in an inactive mode, a function of distribution of an NAS message, a NAS node selection function, sharing of a radio access network, dual connectivity, tight interworking between the NR and the E-UTRA.

The UE refers to a user device. The user device may be referred to as a terminal, mobile equipment (ME), a mobile station (MS). In addition, the user device may be a portable device such as a notebook computer, a mobile phone, a personal digital assistant (PDA), a smartphone, a multimedia device, or the like, or may be a stationary device such as a personal computer, a vehicle-mounted device, or the like.

Figure 5:
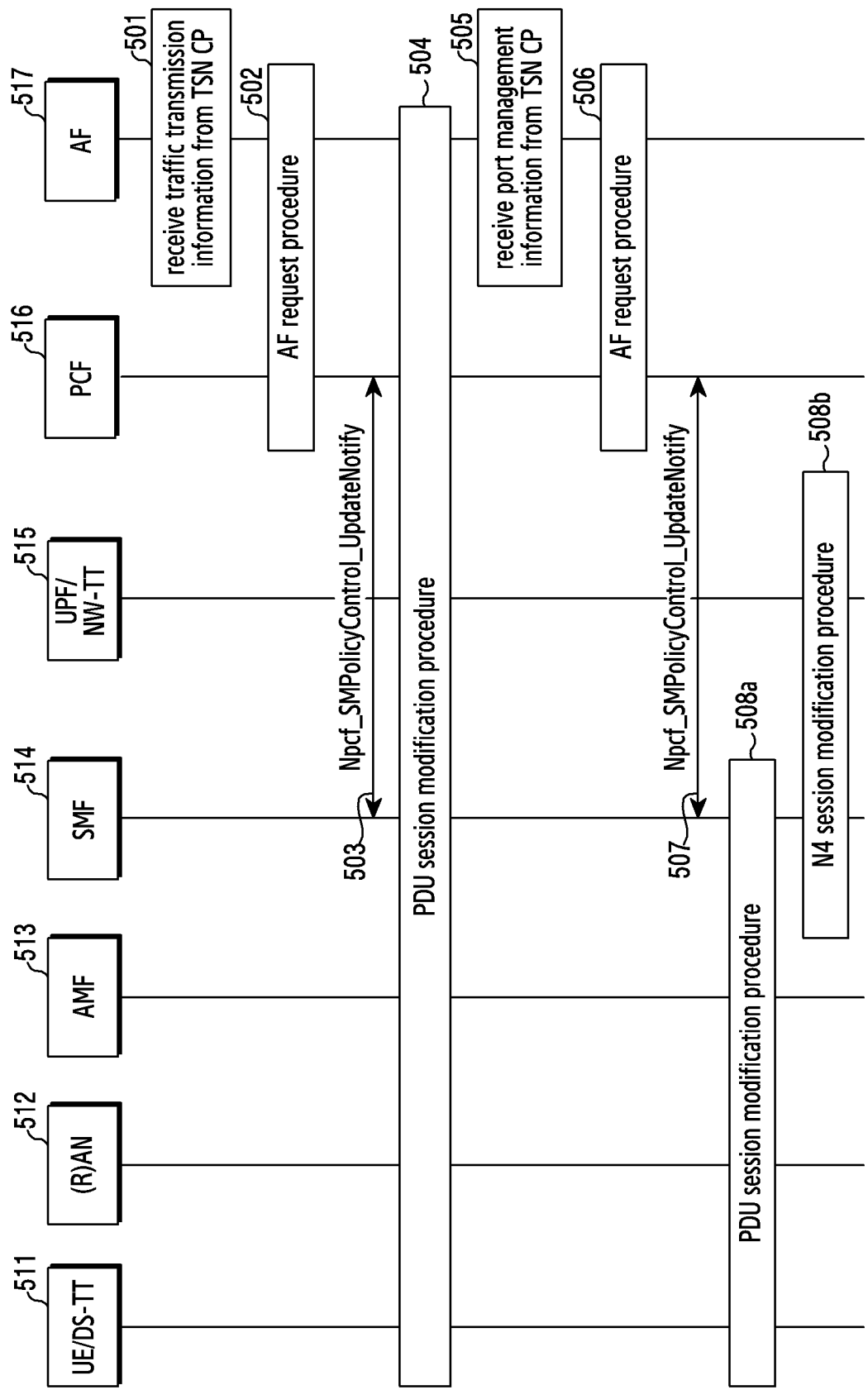
FIG. 5 is a view illustrating a process of configuring bridge management information when a 5GS interworks with TSN in a wireless communication system according to an embodiment of the disclosure.

Although FIG. 1 does not illustrate an unstructured data storage network function (UDSF), a structured data storage network function (SDSF), a network exposure function (NEF), and an NF repository function (NRF) for the sake of clarity of explanation, all NFs illustrated in FIG. 5 may interact with the UDSF, the NEF, and the NRF when necessary.

The NEF provides a means for safely exposing a third party, internal exposure/re-exposure, application function, services and capabilities for edge computing, which are provided by 3GPP network functions. The NEF receives information (based on exposed capability (capabilities) of other network function(s)) from other network function(s). The NEF may store information received as structured data by using an interface which is standardized for a data storage network function. The stored information may be re-exposed to other network function(s) and application function(s) by the NEF, and may be used for other purposes such as analysis.

The NRF supports a service discovery function. The NRF receives an NF discovery request from an NF instance and provides information of a discovered NF instance to the NF instance. In addition, the NRF maintains available NF instances and their supporting services.

The SDSF is an optional function for supporting a function of storing and retrieving information as data structured by a certain NEF.

The UDSF is an optional function for supporting a function of storing and retrieving information as data non-structured by a certain NF.

Although FIG. 1 illustrates a reference model in a case where UE accesses one DN by using one PDU session for convenience of explanation, the disclosure is not limited thereto.

The UE may access two (that is, local and central) data networks simultaneously by using a plurality of PDU sessions. In this case, two SMFs may be selected for different PDU sessions. However, each SMF may have capability of controlling both a local UPF and a central UPF in a PDU session.

In addition, the UE may access two (that is, local and central) data networks provided within a single PDU session simultaneously.

In a 3GPP system, a conceptual link for connecting between NFs in a 5G system is defined as a reference point. Examples of reference points included in the 5G system architecture expressed in FIG. 1 are as follows:

N1: Reference point between the UE and the AMF;
N2: Reference point between the (R) AN and the AMF;
N3: Reference point between the (R) AN and the UPF;
N4: Reference point between the SMF and the UPF;
N5: Reference point between the PCF and the AF;
N6: Reference point between the UPF and the data network;
N7: Reference point between the SMF and the PCF;
N8: Reference point between the UDM and the AMF;
N9: Reference point between two core UPFs;
N10: Reference point between the UDM and the SMF;
N11: Reference point between the AMF and the SMF;
N12: Reference point between the AMF and the AUSF;
N13: Reference point between the UDM and the AUSF;
N14: Reference point between two AMFs; and
N15: Reference point between the PCF and the AMF in the case of a non-roaming scenario, reference point between the PCF and the AMF in a visited network in the case of a roaming scenario.

Figure 2:
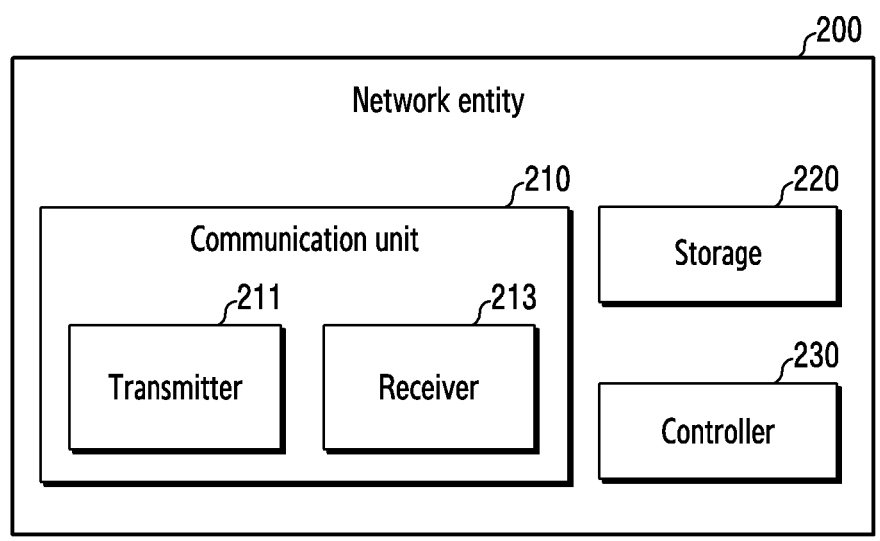
FIG. 2 is a view illustrating a configuration of a network entity in a wireless communication system according to an embodiment of the disclosure.

FIG. 2 illustrates a configuration of a network entity in a wireless communication system according to an embodiment of the disclosure.

The network entity of the disclosure is a concept including a network function according to system implementation.

The term "unit" or terms ending with suffixes "-er," and "-or" refer to a unit processing at least one function or operation, and may be implemented by hardware, software, or a combination of hardware and software.

Referring to FIG. 2, the network entity according to various embodiments of the disclosure may include a communication unit 210, a storage 220, and a controller 230 for controlling overall operations of the network entity 200.

The communication unit 210 transmits and receive data to and from other network entities. Accordingly, an entirety or a part of the communication unit 210 may be referred to as a "transmitter" 211, a "receiver" 213, or a "transceiver" (e.g., communication unit 210).

The storage 220 may store data such as a basic program for the operation of the network entity 200, an application program, configuration information, or the like. The storage 220 may be configured by a volatile memory, a nonvolatile memory, or a combination of a volatile memory and a nonvolatile memory. In addition, the storage 220 may provide stored data according to a request of the controller 230.

The controller 230 controls overall operations of the network entity 200. For example, the controller 230 transmits and receives signals through the communication unit 210. In addition, the controller 230 may write or read out data on or from the storage 220. In addition, the controller 230 may perform functions of a protocol stack required by communication standards. To achieve this, the controller 230 may include a circuit, an application-specific circuit, at least one processor or a micro-processor, or may be a part of a processor. A part of the communication unit 210 and the controller 330 may be referred to as a communication processor (CP). The controller 230 may control the network entity 200 to perform one operation according to various embodiments of the disclosure.

The communication unit 210 and the controller 230 may not be necessarily implemented as separate modules, and may be implemented as one configuration unit in the form of a single chip or software block. The communication unit 210, the storage 220, and the controller 230 may be electrically connected with one another. In addition, operations of the network entity 200 may be implemented by including the storage 220 storing corresponding program codes in the network entity 200.

The network entity 200 may include a network node, and may be one of a base station (RAN), an AMF, an SMF, a UPF, an NF, an NEF, an NRF, a CF, an NSSF, a UDM, an AF, an AUSF, an SCP, a UDSF, an NWDAF, a context storage, operations, administration and maintenance (OAM), an EMS, a configuration server, an identifier (ID) management server.

Various embodiments of the disclosure relate to an apparatus and a method for achieving time synchronization between terminals by interworking with a wired network which supports time sensitive networking (TSN) for a 3GPP 5G system (5GS) in a wireless communication system, and then providing time sensitive communication (TSC).

The 3GPP network provides a method for supporting TSC by interworking with the TSN. To interwork with the TSN, the 5GS operates as one bridge. When information is transmitted between units in the 5GS bridge, unnecessary information is selectively transmitted and received according to relevancy with PDU session information, so that efficiency regarding amounts of data, transmission patch, etc. can be enhanced.

In the related-art 3GPP network, a TSN application function (AF) collects device side TSN translator (DS-TT)/user equipment (UE)-relevant information and network side TSN translator (NW-TT)/user plane function (UPF)-relevant information for supporting TSC, and may report the information to a centralized network configuration (CNC) of the TSN, or the TSN AF may configure information received from the CNC at the DS-TT/UE and the NW-TT/UPF. In the information transmitted for reporting or configuration, information transmitted from the NW-TT/UPF may include information independent from a PDU session. If even this information is transmitted per PDU session, the same information may be redundantly transmitted. For example, if one 5GS bridge supports 10 PDU sessions, information may be transmitted to the TSN AF ten times when there is a change in the NW-TT/UPF. However, according to an embodiment of the disclosure, information is transmitted from the NW-TT/UPF to the TSN AF only a single time. According to another embodiment of the disclosure, even when a redundant change occurs in some sections, redundancy of information may be reduced in the other sections. For example, information may be transmitted from the NW-TT/UPF to a session management function (SMF) 10 times, but information may be transmitted from the SMF to the TSN AF only a single time. According to another embodiment of the disclosure, information independent from a PDU session may be transmitted to the TSN AF via an NEF, and information related to a PDU session may be transmitted to the TSN AF without passing through the NEF, so that a transmission path can be selected and optimized.

Time synchronization of related nodes may be required to support a scenario such as factory automation. In particular, in a case where a precise operation is required, a degree of precision of time synchronization should increase. TSN technology which is a method for supporting time synchronization between nodes connected via the Ethernet when the Ethernet is used for industrial purpose has been researched, commercialized, and used.

In an application for factory automation, a small message is transmitted and received continuously and periodically, and such a continuous message generated periodically is referred to as a stream in the TSN. A TSN node for generating a stream is referred to as a talker, and a TSN node for receiving and consuming the stream is referred to as a listener. The TSN should determine a path in advance and should allocate resources on the path in order to transmit a stream from the talker to the listener while guaranteeing a regular delay. This process is referred to as resource management.

Methods for resource management may include a centralized model and a distributed model. In the centralized model, a central server which collects requirements regarding a stream from a talker and a listener, and manages the requirements is referred to as a centralized user configuration (CUC). A node that takes charge of a function of transmitting traffic in the TSN is referred to as a bridge, and a server that takes charge of collecting information from the bridge and configuring the bridge is referred to as a centralized network configuration (CNC). The CNC receives stream requirements from the CUC, and determines an optimal path for each stream and resources necessary for each bridge on the path, based on collected information such as connection information between bridges and a resource state of each bridge. The CNC reports, to each bridge, determined resource allocation information, specifically, input and output ports for supporting each stream and schedule information of traffic arriving at this time, and the bridge allocates resources such as bandwidth, etc. accordingly.

Figure 3:
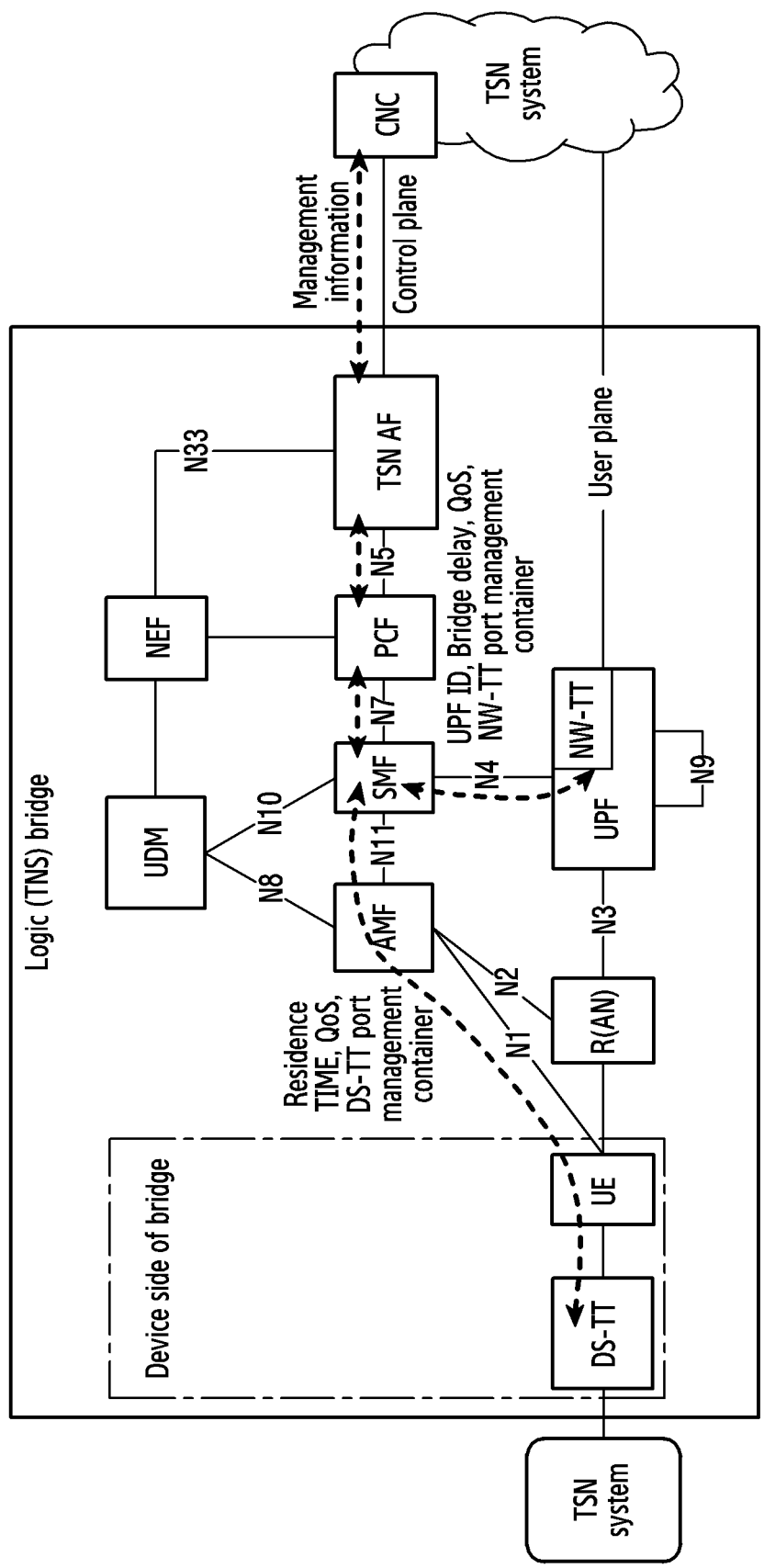
FIG. 3 is a view illustrating a structure for transmitting bridge management information when a 5G system (5GS) interworks with time sensitive networking (TSN) in a wireless communication system according to an embodiment of the disclosure.

FIG. 3 illustrates a structure for transmitting bridge management information when a 5GS interworks with TSN in a wireless communication system according to an embodiment of the disclosure.

Referring to FIG. 3, the 5GS exchanges management information with a CNC of TSN as one bridge, and a TSN AF takes charge of this function. For example, the 5GS AF bridge reports, to the TSN AF, bridge delay information, neighboring node information per port. The TSN AF transmits this information to the CNC. The CNC knows topology of each TSN bridge and node, and reflects transmission requirements of each stream and transmits forwarding information and scheduling information to each TSN bridge. When the CNC transmits the forwarding information, the scheduling information, a node discovery method of each port to the 5GS bridge, the TSN AF receives the same information and configures it at a DS-TT/UE and an NW-TT/UPF.

Figure 4:
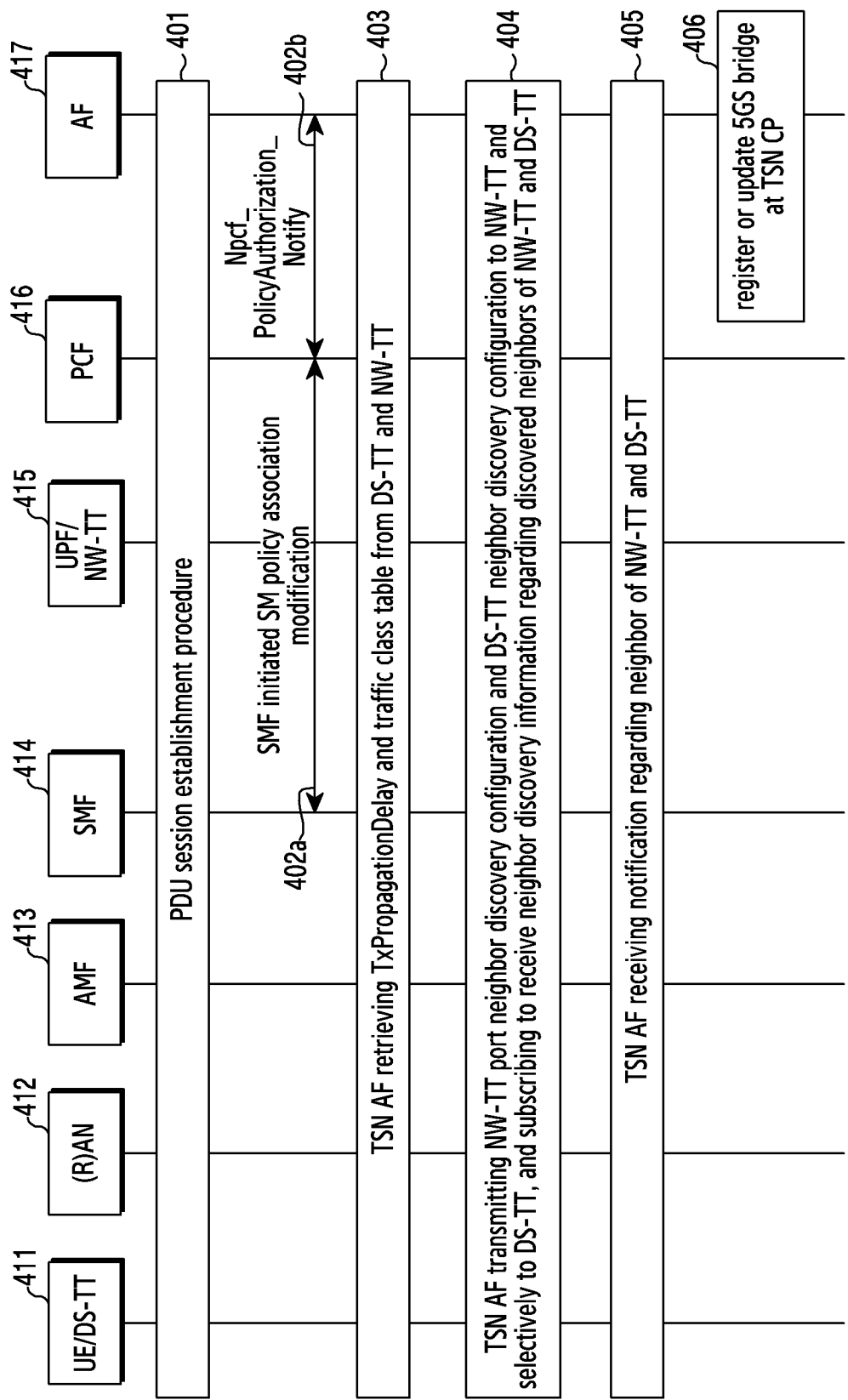
FIG. 4 is a view illustrating a process of reporting bridge management information when a 5GS interworks with TSN in a wireless communication system according to an embodiment of the disclosure.

FIG. 4 illustrates a process of reporting bridge management information when a 5GS interworks with TSN in a wireless communication system according to an embodiment of the disclosure.

In FIG. 4, UE/DS-TT 411, (R)AN 412, AMF 413, SMF 414, UPF/NW-TT 415, PCF 416, and AF 417 operate in a wireless communication system.

Referring to FIG. 4, at operation 401, a PDU session establishment procedure is performed. While the PDU session establishment process is performed at operation 401, a UE/DS-TT 411, a UPF/NW-TT 415, and a TSN AF 417 are associated with one another. In this process, a port address, a port number of the UE/DS-TT 411, a 5GS bridge ID of the UPF/NW-TT 415, and a port media access control (MAC) address and a port number of the UPF/NW-TT 415 are stored in the TSN AF 417.

At operation 402a, SMF initiated SM policy association modification is performed. At operation 402b, a PCF 416 and the TSN AF 417 exchange Npcf_PolicyAuthorization_Notify with each other. At operations 402a and 402b, policy information updating between an SMF 414 and the PCF 416 is achieved in relation to a PDU session. Through this process, a subscription is made to an event of TxPropagationDelay, a result of a link layer discovery protocol (LLDP), and a notification of a corresponding event between the PCF 416 and the TSN AF 417 is authorized.

At operation 403, the TSN AF 417 retrieves TxPropagationDelay and a traffic class table from the UE/DS-TT 411 and the UPF/NW-TT 415. At operation 403, the UE/DS-TT 411 and the UPF/NW-TT 415 transmit TxPropagationDelay and supporting traffic class information to the TSN AF 417.

At operation 404, the TSN AF 417 transmits an UPF/NW-TT 415 port neighbor discovery configuration and a UE/DS-TT 411 port neighbor discovery configuration to the UPF/NW-TT 415 and selectively to the UE/DS-TT 411, and subscribes to receive neighbor discovery information regarding the discovered neighbors of the UPF/NW-TT 415 and the UE/DS-TT 411. At operation 404, the TSN AF 417 transmits an LLDP configuration to the UE/DS-TT 411 and the UPF/NW-TT 415. An LLDP of the UE/DS-TT 411 may be directly performed by the UE/DS-TT 411, or may be performed by the UPF/NW-TT 415 on behalf of the UE/DS-TT 411. An LLDP of the UPF/NW-TT 415 may be performed by the UPF/NW-TT 415.

At operation 405, the TSN AF 417 receives a notification regarding neighbors of the UPF/NW-TT 415 and the UE/DS-TT 411. At operation 405, the UE/DS-TT 411 and the UPF/NW-TT 415 transmit, to the TSN AF 417, a result of the LLDP, that is, MAC addresses of neighboring nodes connected to the DS-TT port and MAC addresses of neighboring nodes connected per port of the UPF/NW-TT 415.

At operation 406, the TSN AF 417 registers or updates a 5GS bridge on a TSN control plane (CP). At operation 406, the TSN AF 417 transmits 5GS bridge-relevant information to a CNC of TSN. This information includes a 5GS bridge ID, port information of the UE/DS-TT 411 and the UPF/NW-TT 415, bridge delay information of each supporting traffic class (TC) between a pair of ports, neighboring node information of each port.

FIG. 5 illustrates a process of configuring bridge management information when a 5GS interworks with TSN in a wireless communication system according to an embodiment of the disclosure.

In FIG. 5, UE/DS-TT 511, (R)AN 512, AMF 513, SMF 514, UPF/NW-TT 515, PCF 516, and AF 517 operate in a wireless communication system.

Referring to FIG. 5, at operation 501, a TSN AF 517 receives traffic transmission information from a TSN CP. At operation 501, the TSN AF 517 receives traffic forwarding (FWD) information from a CNC.

At operation 502, an AF request procedure is performed. At operation 502, the TSN AF 517 transmits the traffic FWD information to a PCF 516.

At operation 503, an SMF 514 and the PCF 516 exchange Npcf_SMPolicyControl_UpdateNotify with each other. At operation 503, the PCF 516 transmits the traffic FWD information to the SMF 514.

At operation 504, a PDU session modification procedure is performed. At operation 504, the SMF 514 transmits the traffic FWD information to an UPF/NW-TT 515 and a UE/DS-TT 511.

At operation 505, the TSN AF 517 receives port management information from the TSN CP. At operation 505, the TSN AF 517 receives port management information from the CNC. Herein, the port management information includes scheduling (SCH) information for each port.

At operation 506, an AF request procedure is performed. At operation 506, the TSN AF 517 transmits the port management information to the PCF 516.

At operation 507, the SMF 514 and the PCF 516 exchange Npcf_SMPolicyControl_UpdateNotify with each other. At operation 507, the PCF 516 transmits the port management information.

At operation 508*a*, a PDU session modification procedure is performed. At operation 508*a*, the SMF 514 transmits the port management information to the UE/DS-TT 511 by using the PDU session modification procedure.

At operation 508*b*, an N4 session modification procedure is performed. At operation 508*b*, the SMF 514 transmits the port management information to the UPF/NW-TT 515 by using the N4 session modification procedure.

Figure 6:
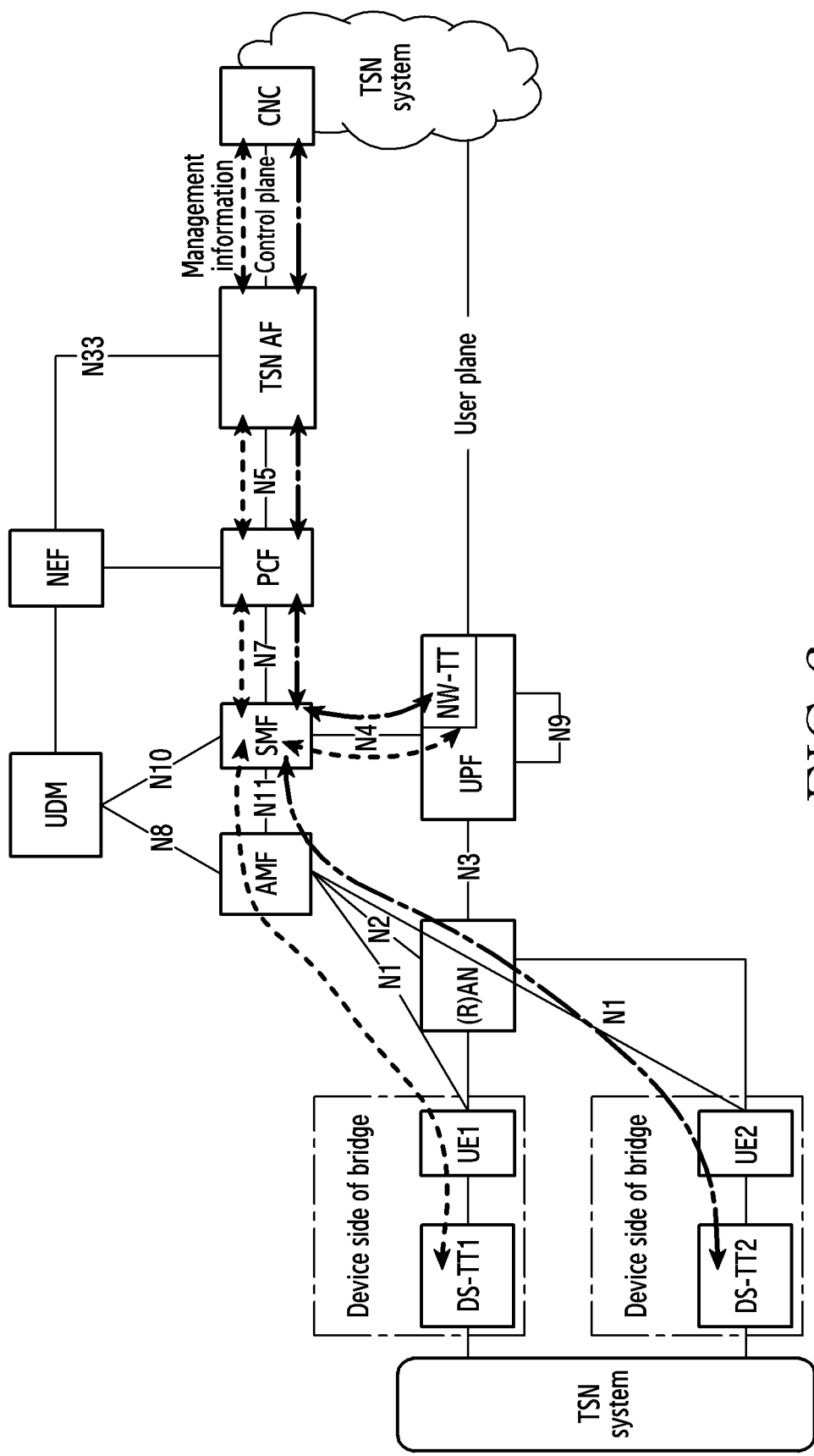
FIG. 6 is a view illustrating a process of transmitting 5GS bridge management information regarding two protocol data unit (PDU) sessions in a wireless communication system according to an embodiment of the disclosure.

FIG. 6 illustrates a process of transmitting 5GS bridge management information regarding two PDU sessions in a wireless communication system according to an embodiment of the disclosure.

Referring to FIG. 6, in a PDU session establishment process for a DS-TT1/UE1, the DS-TT1/UE1 and an NW-TT/UPF are associated with each other to store relevant information in a TSN AF, and are configured to report to the TSN AF when information of the DS-TT1/UE1 and the NW-TT/UPF is changed. In the same way, in a PDU session establishment process for a DS-TT2/UE2, the DS-TT2/UE2 and the NW-TT/UPF are associated with each other to store relevant information in the TSN AF, and are configured to report to the TSN AF when information of the DS-TT2/UE2 and the NW-TT/UPF is changed. Accordingly, when information of the NW-TT/UPF is changed, the NW-TT/UPF reports to the TSN AF for a PDU session for the DS-TT1/UE1, and also, reports to the TSN AF through a PDU session for the DS-TT2/UE2. Therefore, the same information is redundantly transmitted. Similarly, when the TSN AF tries to configure information at the NW-TT/UPF, the TSN AF may be confused in determining whether information is transmitted by using the PDU session for the DS-TT1/UE1 or whether information is transmitted by using the PDU session for the DS-TT2/UE2.

N1 interface is between UE1/UE2 and AMF, N2 interface is between (R)AN and AMF, N3 interface is between (R)AN and UPF, N4 interface is between UPF and SMF, N5 interface is between PCF and TSN AF, N7 interface is between SMF and PCF, N8 interface is between AMF and UDM, N9 interface is between UPFs, N10 interface is between UDM and SMF, N11 interface is between AMF and SMF, N33 interface is between NEF and TSN AF.

FIG. 7 illustrates a management table for PDU session mapping per information in a wireless communication system according to an embodiment of the disclosure.

In FIG. 7, information A corresponds to a port management information container (PMIC). PMIC has one associated PDU session, may have PDU session dependency, and the number of data policy transmissions is 1. PMIC is determined for each DS-TT. Accordingly, when the PDU session associated with the PMIC is changed, the PMIC is transmitted only by the changed associated PDU session.

Information B and information C correspond to a bridge management information container (BMIC). Information B corresponds to an information element dependent on the PDU session among the information elements in the BMIC, and information C corresponds to an information element irrelevant to the PDU session among the information elements in the bridge management information container.

When there are two or more PDU sessions related to specific information, either information B or information C may be classified according to session independency. When there are two or more PDU sessions related to specific information, it is determined as information necessary for all PDU sessions of the entire bridge.

Since the information element in the BMIC is located in the NW-TT, it can be included in the BMIC and transmitted. However, since the DS-TT LLDP-related information among the information elements in the BMIC is information managed for each DS-TT port, information can be generated only when a PDU session of the corresponding port is associated. Since DS-TT LLDP-related information among the information elements in the BMIC is included in the BMIC, it can be transmitted using any PDU session thereafter. Therefore, among the information elements in the BMIC, the DS-TT LLDP-related information corresponds to information C in FIG. 7.

BMIC is transmitted by a PDU session for DS-TT1 when only DS-TT1 is associated. If DS-TT2 is additionally associated with BMIC, BMIC may be transmitted by a PDU session for DS-TT2. However, in this case, since there are two PDU sessions related to the BMIC, the BMIC cannot correspond to the information A. BMIC information exists even before the PDU session is established. However, BMIC information can be transmitted only when at least one associated PDU session exists.

Referring to FIG. 7, an NW-TT/UPF or SMF may perform PDU session mapping per information to report, and a TSN AF, a PCF, an NEF may perform PDU session mapping per information to configure. A corresponding unit stores a PDU session corresponding to each information element to perform PDU session mapping in a PDU session establishment process. In this case, a DS-TT port number may indicate a PDU session. Updating is performed by determining whether corresponding information is information for each PDU session, whether corresponding information is PDU session independent information, and whether updating of the corresponding information element is performed by the same PDU session modification procedure or by a different PDU session procedure. That is, if information B or C is updated with a modification process of a PDU session 1 and then is updated again in a modification process of a PDU session 2, this information may be primarily classified as PDU session independent information. After that, if information is not port management container information but general bridge management information, the information is classified as information necessary for all of multiple PDU sessions like information B. If information is port management information, the information may be identified as PDU session independent information like information C. PDU session dependency information may be pre-configured, or may be additionally updated during an operation after a process of transmitting real information is checked.

When information is determined as PDU session independent information like information C, the corresponding information may include an indication indicating that the corresponding information is PDU session independent information in a reporting process, and it may be determined whether the corresponding information is redundant information and transmission may be omitted, and a path for transmitting the corresponding information may be selected. A method of selecting the transmission path may use an NEF using path if the NEF is used, and if the NEF is not used, may select a most recently used PDU session, may randomly select a PDU session, or may designate and use a representative PDU session path.

When information is determined as PDU session independent information like information C, the corresponding information may include an indication indicating that the information is PDU session independent information even in a configuration process, and it may be determined whether the corresponding information is redundant information and transmission may be omitted, and a path for transmitting the corresponding information may be selected. A method of selecting the path may use an NEF using path if the NEF is used, and, if the NEF is not used, may select a most recently used PDU session, may randomly select a PDU session, and may designate and use a representative PDU session path.

The method suggested above may be performed within a TSN domain (a set of nodes and bridges in which time synchronization is maintained with reference to one reference clock). When a 5GS bridge supports a plurality of TSN domains, this method is applied according to each TSN domain.

FIGS. 8A to 8F illustrate various scenarios to which the suggested method is applied in a wireless communication system according to various embodiments of the disclosure.

Referring to FIGS. 8A to 8F, if a plurality of PDU sessions go through the same SMF and the same PCF as in the scenario (a), PDU session mapping when bridge management information is reported may be performed by an NW-TT/UPF or the SMF, and PDU session mapping when bridge management information is configured may be performed by a TSN AF or the PCF.

If a plurality of PDU sessions go through different SMFs and the same PCF as in the scenario (b), PDU session mapping when bride management information is reported may be performed by the NW-TT/UPF, and PDU session mapping when bridge management information is configured may be performed by the TSN AF or PCF.

If a plurality of PDU sessions go through the same SMF and different PCFs as in the scenario (c), PDU session mapping when bride management information is reported may be performed by the NW-TT/UPF or the SMF, and PDU session mapping when bridge management information is configured may be performed by the TSN AF.

If a plurality of PDU sessions go through different SMFs and different PCFs as in the scenario (d), PDU session mapping when bride management information is reported may be performed by the NW-TT/UPF, and PDU session mapping when bridge management information is configured may be performed by the TSN AF.

If a plurality of PDU sessions transmit different PDU session independent information through an NEF and transmit PDU session dependent information without passing through the NEF as in the scenario (e), PDU session mapping when bride management information is reported may be performed by the NW-TT/UPF, and PDU session mapping when bridge management information is configured may be performed, first, by the TSN AF with reference to the independency or dependency of the PDU session, and the NEF may select a PDU session when PDU session independent information is transmitted.

If a plurality of PDU sessions transmit different PDU session independent information through the NEF and transmit PDU session dependent information without passing through the NEF as in the scenario (f), PDU session mapping when bride management information is reported may be performed by the NW-TT/UPF, and PDU session mapping when bridge management information is configured may be performed, first, by the TSN AF with reference to independency or dependency of the PDU session, and the NEF may select a PDU session when PDU session independent information is transmitted.

Figure 9:
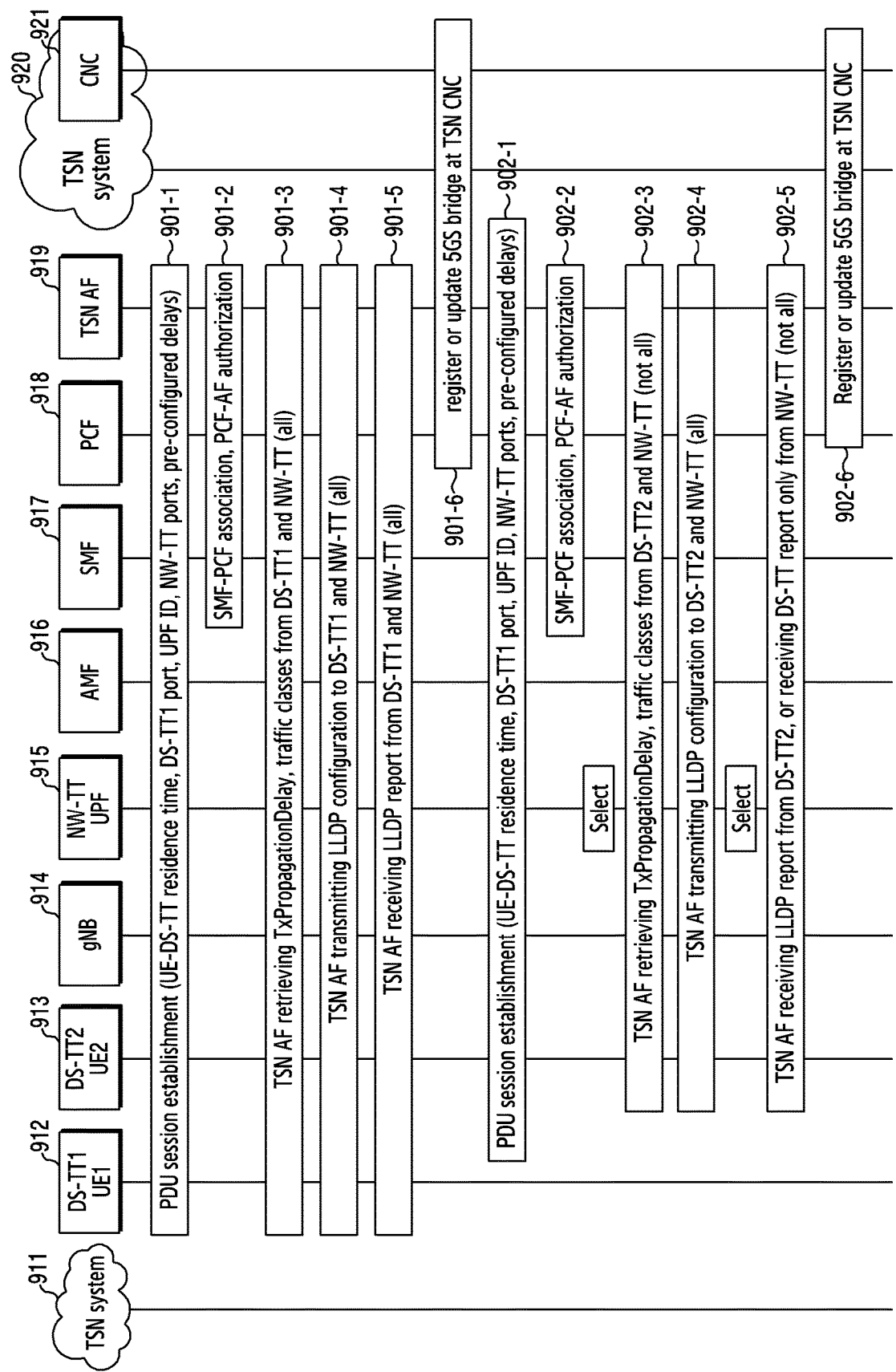
FIG. 9 is a view illustrating a process of performing PDU session mapping with reference to a network side TSN translator (NW-TT)/user plane function (UPF) in a wireless communication system according to an embodiment of the disclosure.

FIG. 9 illustrates a process of performing PDU session mapping with reference to an NW-TT/UPF in a wireless communication system according to an embodiment of the disclosure.

This process relates to a process of reporting bridge management information, and may be used in the scenarios of FIGS. 8A to 8D. This method has an advantage that redundant message generation is minimized in a reporting process.

In FIG. 9, TSN system 911, DS-TT1/UE1 912, DS-TT2/UE2 913, gNB 914, NW-TT/UPF 915, AMF 916, SMF 917, PCF 918, TSN AF 919, TSN system 920, CNC 921 operate in a wireless communication system.

Referring to FIG. 9, at operation 901-1, PDU session establishment (UE-DS-TT residence time, DS-TT1 port, UPF ID, NW-TT ports, pre-configured delays) is performed. At operation 901-1, a DS-TT1/UE1 912 and an NW-TT/UPF 915 may be associated with each other in the PDU session establishment process for the DS-TT1/UE1 912, and corresponding information is stored in a TSN AF. The stored information may include UE-DS-TT residence time of the DS-TT1/UE1 912, a UPF ID, etc.

At operation 901-2, SMF-PCF association, PCF-AF authorization are performed. At operation 901-2, policy information updating between an SMF and a PCF is performed in relation to a PDU session. Through this process, a subscription is made to an event of TxPropagationDelay (delay of link transmission to a neighboring node), an LLDP (protocol for discovering neighboring nodes) result, etc., and authorization is performed with respect to a notification of the corresponding event between the PCF 918 and the TSN AF 919.

At operation 901-3, the TSN AF 919 retrieves TxPropagationDelay, traffic classes from the DS-TT1 and the NW-TT (all). At operation 901-3, the DS-TT1/UE1 912 and the NW-TT/UPF 915 transmit information of TxPropagationDelay and supporting traffic class to the TSN AF 919. In this case, when the NW-TT/UPF 915 transmits the information of TxPropagationDelay and supporting traffic class, the information may include an indication specifying PDU session independency.

At operation 901-4, the TSN AF 919 transmits an LLDP configuration to the DS-TT1/UE1 912 and the NW-TT/UPF 915 (all). At operation 901-4, the TSN AF 919 transmits the LLDP configuration to the DS-TT1/UE1 912 and the NW-TT/UPF 915. An LLDP of the DS-TT1/UE1 912 may be directly performed by the DS-TT1/UE1 912 or may be performed by the NW-TT/UPF 915 on behalf of the DS-TT1/UE1 912. An LLDP of the NW-TT/UPF 915 is performed by the NW-TT/UPF 915. In this case, information regarding the LLDP of the NW-TT/UPF 915 may include an indication specifying PDU session independency.

At operation 901-5, the TSN AF 919 receives an LLDP report from the DS-TT1/UE1 912 and the NW-TT/UPF 915 (all). At operation 901-5, the DS-TT1/UE1 912 and the NW-TT/UPF 915 may transmit, to the TSN AF 919, a result of the LLDP, that is, MAC addresses of neighboring nodes connected to the DS-TT1 port and MAC addresses of neighboring nodes connected to each port of the NW-TT/UPF 915. In this case, information regarding the result of the LLDP of the NW-TT/UPF 915 may include an indication specifying PDU session independency.

At operation 901-6, the TSN AF 919 registers or updates a 5GS bridge at a TSN CNC 921 of TSN system 920. At operation 901-6, the TSN AF 919 transmits 5GS bridge-relevant information to the TSN CNC 921 of the TSN system 920. This information includes a 5GS bridge ID, port information of the DS-TT1/UE1 912 and the NW-TT/UPF 915, bridge delay information of each supporting traffic class (TC) between a pair of ports, and neighboring node information of each port.

At operation 902-1, PDU session establishment (UE-DS residence time, DS-TT1 port, UPF ID, NW-TT ports, pre-configured delays) is performed. At operation 902-1, a DS-TT2/UE2 913 and the NW-TT/UPF 915 are associated with each other in the process of establishing the PDU session for the DS-TT2/UE2 913, and corresponding information is stored in the TSN AF 919. The stored information includes UE-DS-TT residence time of the DS-TT2/UE2 913, a UPF ID, etc.

At operation 902-2, SMF-PCF association, PCF-AF authorization are performed. At operation 902-2, policy information updating between the SMF 917 and the PCF 918 is performed in relation to the PDU session. Through this process, a subscription is made to an event of TxPropagationDelay, an LLDP result, etc., and authorization is performed with respect to a notification of the corresponding event between the PCF and the AF.

The NW-TT/UPF 915 performs selection and an operation at the next operation is changed.

At operation 902-3, the TSN AF 919 retrieves TxPropagationDelay, traffic classes from the DS-TT2/UE2 913 and the NW-TT/UPF 915/UPF (all). At operation 902-3, the DS-TT2/UE2 913 and the NW-TT/UPF 915 transmit information of TxPropagationDelay and supporting traffic class to the TSN AF 919. In this case, when the NW-TT/UPF 915 transmits the information of TxPropagationDelay and supporting traffic class, the information may include an indication specifying PDU session independency. In this case, if there is no difference from the information already transmitted for the PDU session 1 (PDU session for the DS-TT1/UE1 912), this transmission may be omitted.

At operation 902-4, the TSN AF 919 transmits a LLDP configuration to the DS-TT2/UE2 913 and the NW-TT/UPF 915 (all). At operation 902-4, the TSN AF 919 transmits the LLDP configuration to the DS-TT2/UE2 913 and the NW-TT/UPF 915. An LLDP of the DS-TT2/UE2 913 may be directly performed by the DS-TT2/UE2 913, or may be performed by the NW-TT/UPF 915 on behalf of the DS-TT2/UE2 913. An LLDP of the NW-TT/UPF 915 may be performed by the NW-TT/UPF 915. In this case, information regarding the LLDP of the NW-TT/UPF 915 may include an indication specifying PDU session independency. In this case, if there is no difference in the LLDP configuration information from the information already transmitted for the PDU session 1, the TSN AF 919 may omit this transmission.

The NW-TT/UPF 915 performs selection and an operation at the next operation is changed.

At operation 902-5, the TSN AF 919 receives an LLDP report from the DS-TT2/UE2 913, or receives a DS-TT report only from the NW-TT/UPF 915 (all). At operation 902-5, the DS-TT2/UE2 913 and the NW-TT/UPF 915 transmit, to the TSN AF 919, a result of the LLDP, that is, MAC address of neighboring nodes connected to a port of the DS-TT2/UE2 913 and MAC addresses of neighboring nodes connected to each port of the NW-TT/UPF 915. In this case, information regarding the result of the LLDP of the NW-TT/UPF 915 may include an indication specifying PDU session independency. In this case, if there is no difference from the information already transmitted for the PDU session 1, this transmission may be omitted.

At operation 902-6, the TSN AF 919 registers or updates a 5G bridge at the TSN CNC 921. At operation 902-6, the TSN AF 919 transmits 5GS bridge-relevant information to the TSN CNC 921 of the TSN system 920. This information includes a 5GS bridge ID, port information of the DS-TT2/UE2 913 and the NW-TT/UPF 915, bridge delay information of each supporting traffic class (TC) between a pair of ports, neighboring node information of each port.

Figure 10:
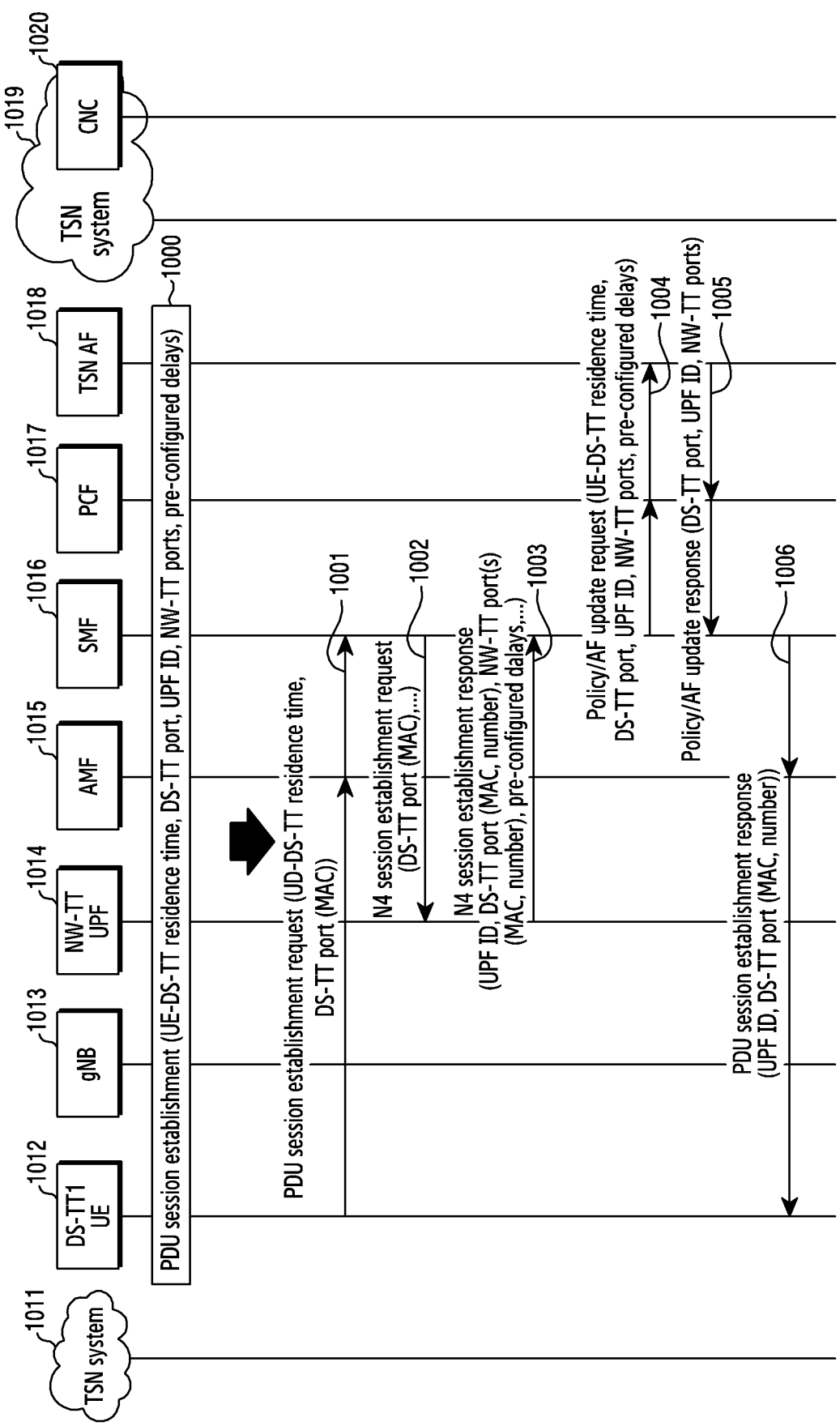
FIG. 10 is a view illustrating a process of establishing a PDU session in a wireless communication system according to an embodiment of the disclosure.

FIG. 10 illustrates a process of establishing a PDU session in a wireless communication system according to an embodiment of the disclosure.

In FIG. 10, TSN system 1011, DS-TT1/UE1 1012, gNB 1013, NW-TT/UPF 1014, AMF 1015, SMF 1016, PCF 1017, TSN AF 1018, TSN system 1019, and CNC 1020 operate in a wireless communication system.

The PDU session establishment process of FIG. 9 may refer to FIG. 10.

Referring to FIG. 10, at operation 1000, PDU session establishment (UE-DS-TT residence time, DS-TT port, UPF ID, NW-TT ports, pre-configured delays) is performed.

At operation 1001, a DS-TT/UE 1012 transmits a PDU session establishment request (UD-DS-TT residence time, DS-TT port (MAC)) to an AMF 1015. In addition, the AMF 1015 transmits the PDU session establishment request to an SMF 1016. At operation 1001, the PDU session establishment request transmitted by the DS-TT/UE 1012 is transmitted to the SMF 1016 via the AMF 1015. In this case, the request may include UE-DS-TT residence time, a DS-TT port MAC address, etc.

At operation 1002, the SMF 1016 transmits an N4 session establishment request (DS-TT port (MAC)) to an NW-TT/

UPF 1014. At operation 1002, the SMF 1016 transmits the NS session establishment request including the DS-TT port MAC address, etc. to the NW-TT/UPF 1014. In this case, the NW-TT/UPF 1014 stores association of a DS-TT port to a 5GS bridge with reference to a UPF ID, and allocates a port number to the DS-TT port.

At operation 1003, the NW-TT/UPF 1014 transmits an N4 session establishment response (UPF ID, DS-TT port (MAC, number), NW-TT port(s) (MAC, number), predefined delays, etc.) to the SMF 1016. At operation 1003, the NW-TT/UPF 1014 transmits the N4 session establishment response to the SMF 1016. The response may include the UPF ID, the MAC address and the port number of the DS-TT port, the MAC address and the port number of the NW-TT port(s), pre-configured delays for DS-TT ports per TC), etc.

At operation 1004, the SMF 1016 transmits a policy/AF update request (UE-DS-TT residence time, DS-TT port, UPF ID, NW-TT ports, pre-configured delays) to a PCF 1017. The PCF 1017 transmits the policy/AF update request to the TSN AF 1018. At operation 1004, the SMF 1016 transmits bridge management information to the TSN AF 1018 via the PCF 1017. In this case, the bridge management information may include UE-DS-TT residence time, DS-TT port information, UPF ID, NW-TT port information, pre-configured delay information.

At operation 1005, the TSN AF 1018 transmits a policy/AF update response (DS-TT port, UPF ID, NW-TT ports) to the PCF 1017. The PCF 1017 transmits the policy/AF update response to the SMF 1016. At operation 1005, the SMF 1016 receives a confirmation that the bridge management information is transmitted from the TSN AF 1018 via the PCF 1017.

At operation 1006, the SMF 1016 transmits a PDU session establishment response (UPF ID, DS-TT port (MAC, number)) to the AMF 1015. The AMF 1015 transmits the PDU session establishment response to the DS-TT/UE 1012. At operation 1006, the SMF 1016 transmits the PDU session establishment response to the DS-TT/UE 1012. In this case, the response may include the DS-TT port number allocated at operation 1003.

Figure 11:
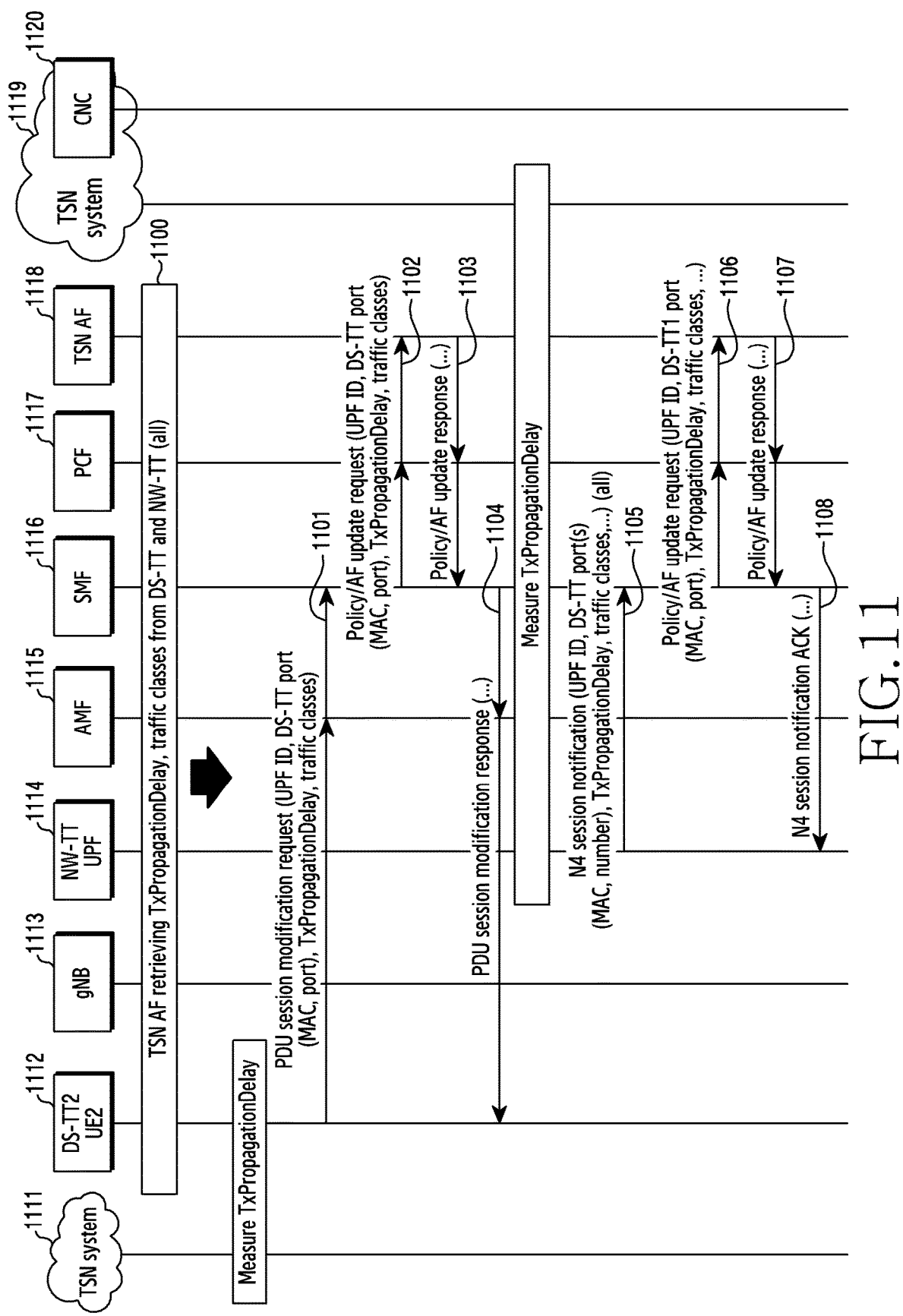
FIG. 11 is a view illustrating a process of transmitting TxPropagationDelay and traffic class in a wireless communication system according to an embodiment of the disclosure.

FIG. 11 illustrates a process of transmitting TxPropagationDelay and traffic class in a wireless communication system according to an embodiment of the disclosure.

In FIG. 11, TSN system 1111, DS-TT2/UE2 1112, gNB 1113, NW-TT/UPF 1114, AMF 1115, SMF 1116, PCF 1117, TSN AF 1118, TSN system 1119, and CNC 1120 operate in a wireless communication system.

The process of transmitting TxPropagationDelay and traffic class in FIG. 9 may refer to FIG. 11.

Referring to FIG. 11, at operation 1100, a TSN AF 1118 retrieves TxPropagationDelay, traffic classes from a DS-TT2/UE2 1112 and an NW-TT/UPF 1114 (all).

TxPropagationDelay measurement is performed. After that, at operation 1101, the DS-TT2/UE2 1112 transmits a PDU session modification request (UPF ID, DS-TT port (MAC, number), TxPropagationDelay, traffic classes) to an AMF 1115. The AMF 1115 transmits the PDU session modification request to an SMF 1116. When the TxPropagationDelay measurement is completed, the DS-TT2/UE2 1112 transmits the PDU session modification request to the SMF 1116 via the AMF 1115 at operation 1101. In this case, the request may include a UPF ID, DS-TT1 port information (MAC address, port number), TxPropagationDelay, traffic class, etc.

At operation 1102, the SMF 1116 transmits a policy/AF update request (UPF ID, DS-TT port (MAC, port), TxPropagationDelay, traffic classes) to a PCF 1117. The PCF 1117 transmits the policy/AF update request to the TSN AF 1118. At operation 1102, the SMF 1116 transmits bridge management information to the TSN AF 1118 via the PCF 1117. In this case, the bridge management information may include the UPF ID, DS-TT1 port information (MAC address, port number), TxPropagationDelay, traffic class information obtained at operation 1101.

At operation 1103, the TSN AF 1118 transmits a policy/AF update response to the PCF 1117. The PCF 1117 transmits the policy/AF update response to the SMF 1116. At operation 1103, the SMF 1116 receives a confirmation that the bridge management information is transmitted from the TSN AF 1118 via the PCF 1117.

At operation 1104, the SMF 1116 transmits a PDU session modification response to the AMF 1115. The AMF 1115 transmits the PDU session modification response to the DS-TT2/UE2 1112. At operation 1104, the SMF 1116 transmits the PDU session modification response to the DS-TT2/UE2 1112.

TxPropagationDelay measurement is performed. After that, at operation 1105, the NW-TT/UPF 1114 transmits an N4 session notification (UPF ID, NW-TT port(s) (MAC, number), TxPropagationDelay, traffic classes) (all) to the SMF 1116. When the TxPropagationDelay measurement is completed, the NW-TT/UPF 1114 transmits an N4 session notification to the SMF 1116 at operation 1105. In this case, the notification may include the UPF ID, information of the NW-TT port(s), TxPropagationDelay, traffic class information, etc. In this case, the notification may include an indication specifying PDU session independency. In this case, if there is no difference from that already transmitted, this transmission may be omitted. If the transmission is omitted, subsequent operations 1106 to 1108 may also be omitted.

At operation 1106, the SMF 1116 transmits a policy/AF update request (UPF ID, DS-TT1 port (MAC, port), TxPropagationDelay, traffic classes, etc.) to the PCF 1117. The PCF 1117 transmits the policy/AF update request to the TSN AF 1118. At operation 1106, the SMF 1116 transmits bridge management information to the TSN AF 1118 via the PCF 1117. In this case, the bridge management information may include the UPF ID, NW-TT port(s) information, TxPropagationDelay, traffic class information obtained at operation 1101.

At operation 1107, the TSN AF 1118 transmits a policy/AF update response to the PCF 1117. The PCF 1117 transmits the policy/AF update response to the SMF 1116. At operation 1107, the SMF 1116 receives a confirmation that the bridge management information is transmitted from the TSN AF 1118 via the PCF 1117.

At operation 1108, the SMF 1116 transmits an N4 session notification acknowledgement (ACK) to the NW-TT/UPF 1114. At operation 1108, the SMF 1116 transmits the N4 session notification ACK to the NW-TT/UPF 1114.

Figure 12:
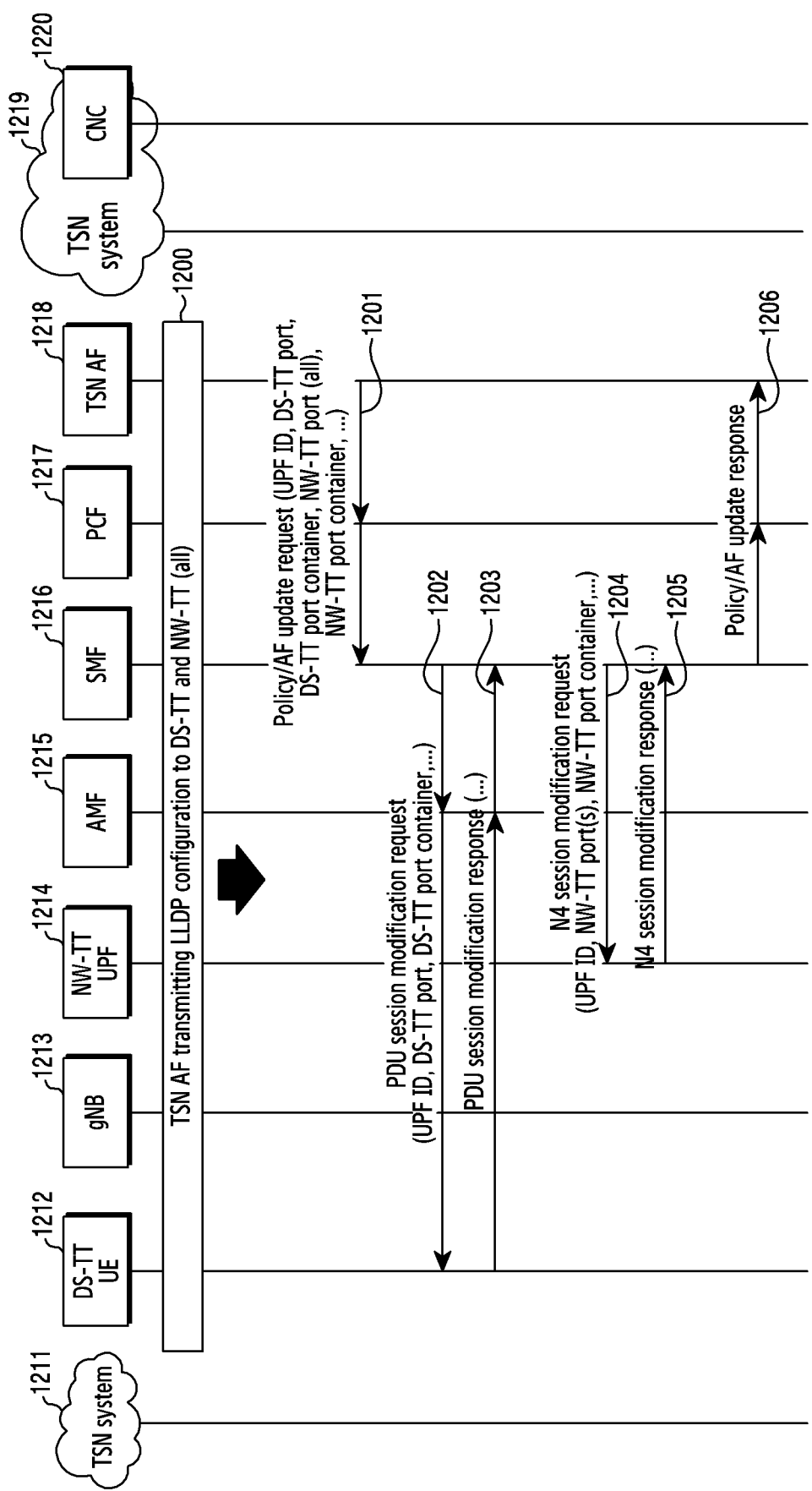
FIG. 12 is a view illustrating a process of transmitting a link layer discovery protocol (LLDP) configuration in a wireless communication system according to an embodiment of the disclosure.

FIG. 12 illustrates a process of transmitting an LLDP configuration in a wireless communication system according to an embodiment of the disclosure.

In FIG. 12, TSN system 1211, DS-TT/UE 1212, gNB 1213, NW-TT/UPF 1214, AMF 1215, SMF 1216, PCF 1217, TSN AF 1218, TSN system 1219, and CNC 1220 operate in a wireless communication system.

The process of transmitting the LLDP configuration in FIG. 9 may refer to FIG. 12.

Referring to FIG. 12, at operation 1200, a TSN AF 1218 transmits an LLDP configuration to a DS-TT/UE 1212 and an NW-TT/UPF 1214 (all).

At operation 1201, the TSN AF 1218 transmits a policy/AF update request (UPF ID, DS-TT port, DS-TT port container, NW-TT port (all), NW-TT port container, etc.) to a PCF 1217. The PCF 1217 transmits the policy/AF update request to the SMF 1216. At operation 1201, the SMF 1216 receives bridge management information from the TSN AF 1218 via the PCF 1217. In this case, the bridge management information may include information of UPF ID, DS-TT port, DS-TT port container, NW-TT port, NW-TT port container, etc. In this case, an NW-TT LLDP configuration of the NW-TT port container may include an indication specifying PDU session independency. In this case, if there is no difference from that already transmitted, this transmission may be omitted. If the transmission is omitted, subsequent operations 1204 to 1206 may also be omitted.

At operation 1202, an SMF 1216 transmits a PDU session modification request (UPF ID, DS-TT port, DS-TT port container, etc.) to an AMF 1215. The AMF 1215 transmits the PDU session modification request to the DS-TT/UE 1212. At operation 1202, the SMF 1216 transmits the PDU session modification request to the DS-TT/UE 1212. In this case, the request may include the UPF ID, DS-TT port, DS-TT port container information, etc. obtained at operation 1201.

At operation 1203, the DS-TT/UE 1212 transmits a PDU session modification response to the AMF 1215. The AMF 1215 transmits the PDU session modification response to the SMF 1216. At operation 1203, the DS-TT/UE 1212 transmits the PDU session modification response to the SMF 1216.

At operation 1204, the SMF 1216 transmits an N4 session modification request (UPF ID, NW-TT port(s), NW-TT port container, etc.) to the NW-TT/UPF 1214. At operation 1204, the SMF 1216 transmits the N4 session modification request to the NW-TT/UPF 1214. In this case, the request may include information of the UPF ID, NW-TT port, NW-TT port container, etc. obtained at operation 1201.

At operation 1205, the NW-TT/UPF 1214 transmits an N4 session modification response to the SMF 1216. At operation 1205, the SMF 1216 receives the N4 session modification response from the NW-TT/UPF 1214.

At operation 1206, the SMF 1216 transmits a policy/AF update response to the PCF 1217. The PCF 1217 transmit the policy/AF update response to the TSN AF 1218. At operation 1206, the SMF 1216 may inform the TSN AF 1218 that transmission of the bridge management information is completed via the PCF 1217.

When an LLDP for a port of the DS-TT/UE 1212 is performed by the NW-TT/UPF 1214 on behalf of the DS-TT/UE 1212, the DS-TT port container may be omitted at operation 1201 and operations 1202 and 1203 may be omitted. The information for transmitting the LLDP for the DS-TT port to the NW-TT/UPF 1214 at operation 1204 may not include a PDU session independency indication. Accordingly, in this case, operations 1204 to 1206 may not be omitted.

Figure 13:
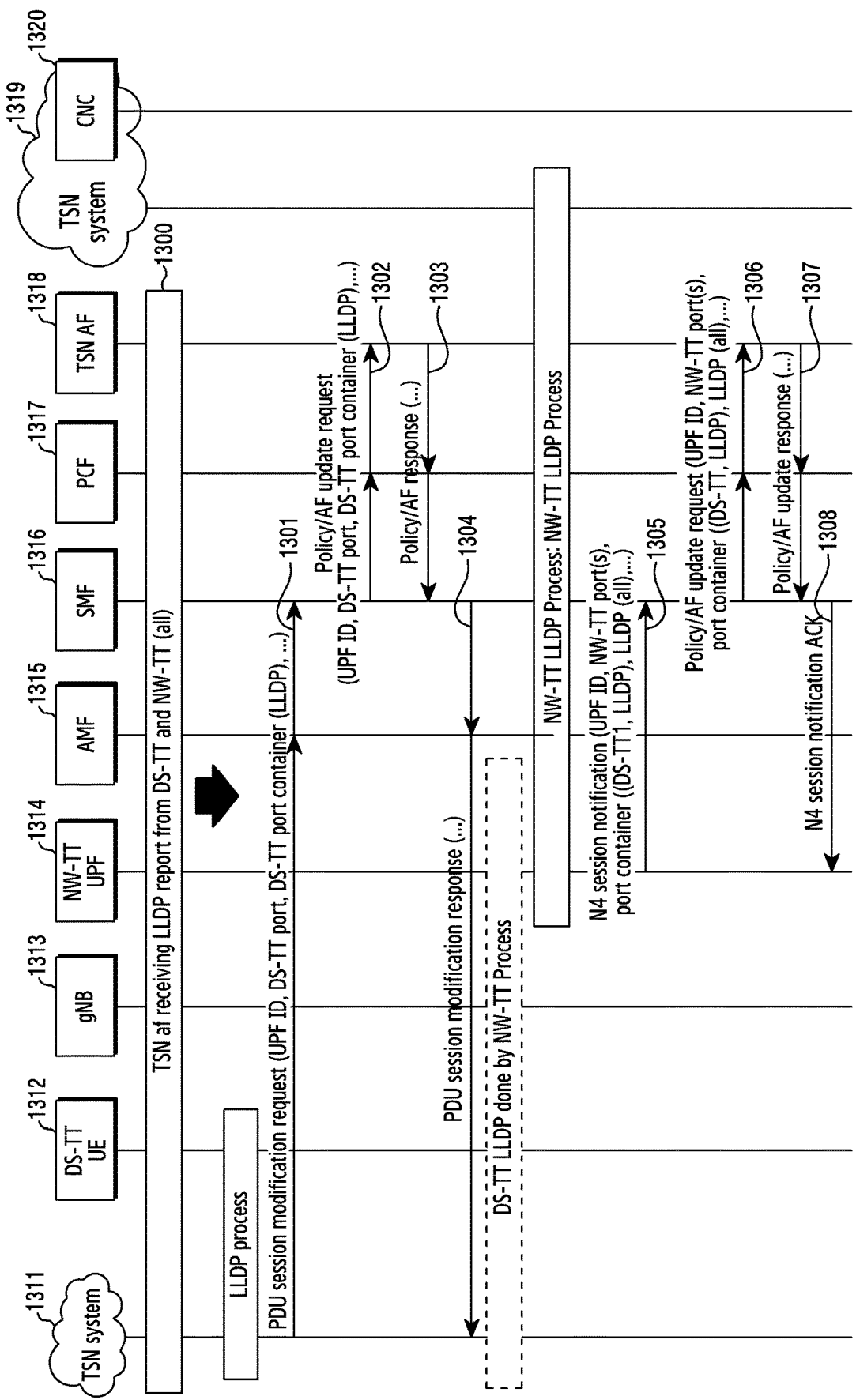
FIG. 13 is a view illustrating a process of transmitting an LLDP report in a wireless communication system according to an embodiments of the disclosure.

FIG. 13 illustrates a process of transmitting an LLDP report in a wireless communication system according to an embodiment of the disclosure.

In FIG. 13, TSN system 1311, DS-TT/UE 1312, gNB 1313, NW-TT/UPF 1314, AMF 1315, SMF 1316, PCF 1317, TSN AF 1318, TSN system 1319, and CNC 1320 operate in a wireless communication system.

The process of transmitting the LLDP report in FIG. 9 may refer to FIG. 13.

Referring to FIG. 13, at operation 1300, a TSN AF 1318 receives an LLDP report from a DS-TT/UE 1312 and an NW-TT/UPF 1314 (all).

An LLDP process is performed. After that, at operation 1301, a TSN system 1311 transmits a PDU session modification request (UPF ID, DS-TT port, DS-TT port container (LLDP), etc.) to an AMF 1315. The AMF 1315 transmit the PDU session modification request to an SMF 1316. After the LLDP process is completed, the DS-TT/UE 1312 transmits a PDU session modification request to the SMF 1316 at operation 1301. In this case, the request may include information of the UPF ID, DS-TT port, DS-TT port container (LLDP).

At operation 1302, the SMF 1316 transmits a policy/AF update request (UPF ID, DS-TT port, DS-TT port container (LLDP), etc.) to a PCF 1317. The PCF 1317 transmits the policy/AF update request to the TSN AF 1318. At operation 1302, the SMF 1316 transmits bridge management information to the TSN AF 1318 via the PCF 1317. In this case, the bridge management information may include information of the UPF ID, DS-TT port, DS-TT port container (LLDP) obtained at operation 1301.

At operation 1303, the TSN AF 1318 transmits a policy/AF response to the PCF 1317. The PCF 1317 transmits the policy/AF response to the SMF 1316. At operation 1303, the SMF 1316 receives a confirmation that bridge management information is transmitted from the TSN AF 1318 via the PCF 1317.

At operation 1304, the SMF 1316 transmits a PDU session modification response to the AMF 1315. The AMF 1315 transmits the PDU session modification response to the TSN system 1311. At operation 1304, the SMF 1316 transmits the PDU session modification response to the DS-TT/UE 1312.

A DS-DD LLDP may be done by an NW-TT processor.

An NW-TT LLDP process is performed. After that, at operation 1305, the NW-TT/UPF 1314 transmits an N4 session notification (UPF ID, NW-TT port(s), port container (DS-TT1 LLDP), LLDP (all)) to the SMF 1316. After the LLDP process is completed, at operation 1305, the NW-TT/UPF 1314 transmits the N4 session notification. In this case, the notification may include information of the UPF ID, NW-TT port(s), port container (LLDP). In this case, the NW-LLDP report of the NW-TT port container may include an indication specifying PDU session independency. If there is no difference from that already transmitted, this transmission may be omitted. If the transmission is omitted, subsequent operations 1306 to 1308 may also be omitted.

At operation 1306, the SMF 1316 transmits a policy/AF update request (UPF ID, NW-TT port(s), port container (DS-TT LLDP), LLDP (all), etc.) to the PCF 1317. The PCF 1317 transmits the policy/AF update request to the TSN AF 1318. At operation 1306, the SMF 1316 transmits bridge management information to the TSN AF 1318 via the PCF 1317. In this case, the bridge management information may include information of the UPF ID, NW-TT port(s), port container (LLDP) obtained at operation 1305.

At operation 1307, the TSN AF 1318 transmits a policy/AF update response to the PCF 1317. The PCF 1317 transmits the policy/AF update response to the SMF 1316. At operation 1307, the SMF 1316 receives a notification that transmission of the bridge management information is completed from the TSN AF 1318 via the PCF 1317.

At operation 1308, the SMF 1316 transmits an N4 session notification ACK to the NW-TT/UPF 1314. At operation 1308, the SMF 1316 transmits the N4 session notification ACK to the NW-TT/UPF 1314.

When an LLDP of the DS-TT port is performed by the NW-TT/UPF 1314 on behalf of the DS-TT/UE 1312, operations 1301 to 1304 may be omitted. After the LLDP process of the DS-TT port is performed by the NW-TT/UPF 1314 instead, at operation 1305, the NW-TT/UPF 1314 transmits an N4 session notification. In this case, the notification may include information of the UPF ID, NW-TT port(s), port container (DS-TT LLDP). In this case, the DS-TT LLDP report of the NW-TT port container does not include an indication specifying PDU session independency. This transmission is not omitted. Accordingly, subsequent operations 1306 to 1308 may not also be omitted.

Figure 14:
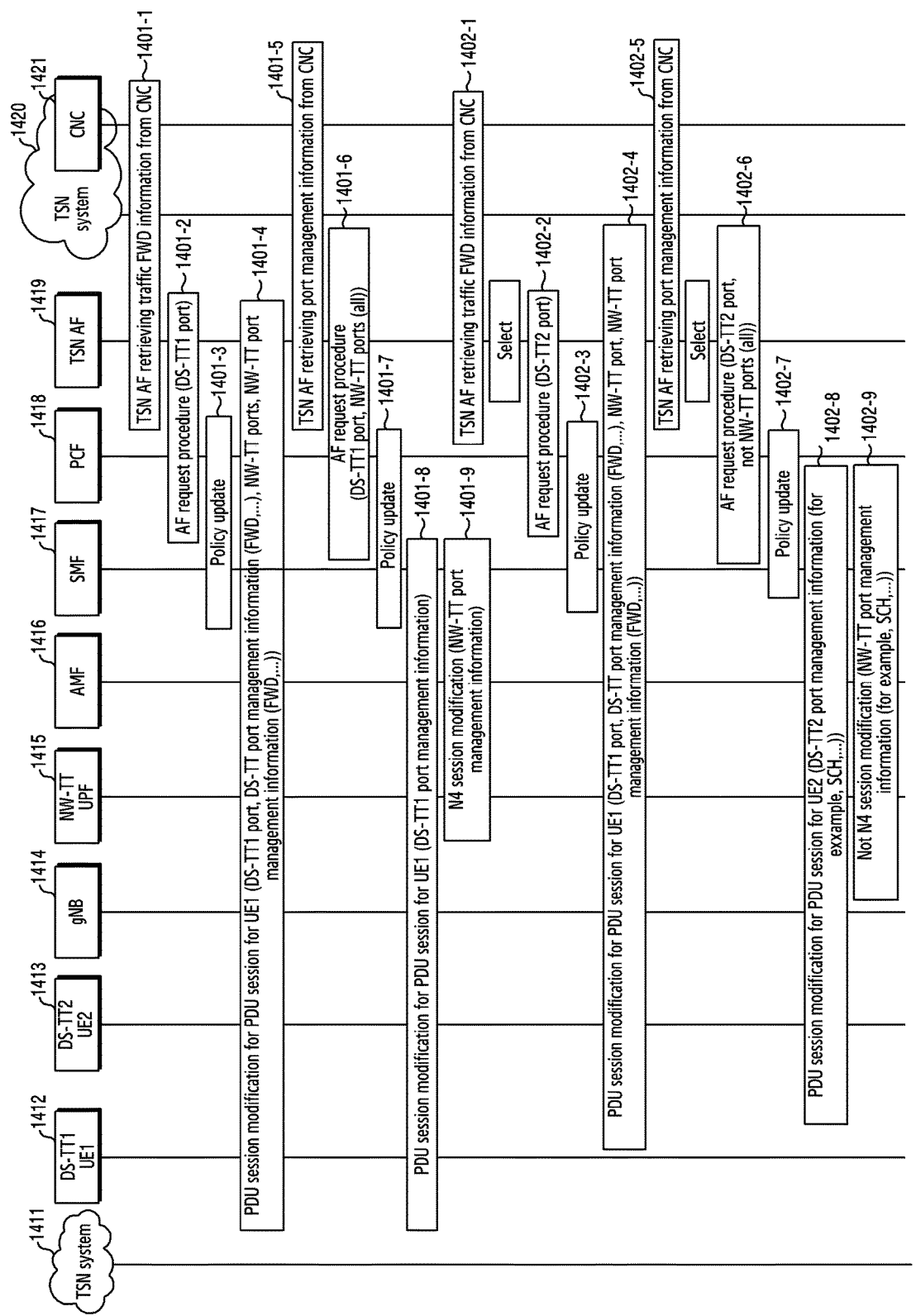
FIG. 14 is a view illustrating a process of performing PDU session mapping with reference to a TSN application function (AF) in a wireless communication system according to an embodiment of the disclosure.

FIG. 14 illustrates a process of performing PDU session mapping with reference to a TSN AF in a wireless communication system according to an embodiment of the disclosure.

This process relates to a process of configuring bridge management information, and may be used in the scenarios of FIGS. 8A to 8D. This method has an advantage that redundant message generation in a configuration process is minimized.

In FIG. 14, TSN system 1411, DS-TT1/UE1 1412, DS-TT2/UE2 1413, gNB 1414, NW-TT/UPF 1415, AMF 1416, SMF 1417, PCF 1418, TSN AF 1419, TSN system 1420, and CNC 1421 operate in a wireless communication system.

Referring to FIG. 14, at operation 1401-1, a TSN AF 1419 retrieves traffic FWD information from a CNC 1421 of TSN system 1420. At operation 1401-1, the TSN AF 1419 receives the traffic FWD information from the CNC 1421 of TSN system 1420.

At operation 1401-2, an AF request procedure (DS-TT1 port) is performed. At operation 1401-2, the TSN AF 1419 transmits bridge management configuration information to a PCF 1418. In this case, if the DS-TT port is included in the traffic FWD information, the bridge management information is PDU session dependent information, and, if the traffic FWD information is independent from the DS-TT port, the bridge management information may include a PDU session independency indication. If the information is the same as information already transmitted, the transmission may be omitted. In this case, subsequent operations 1401-3 and 1401-4 may be omitted. Herein, since the bridge management information is information which is transmitted for the first time, the information is not redundant information, and accordingly, operations 1401-3 and 1401-4 may not be omitted. Herein, it is assumed that the bridge management information is information which includes a port of the DS-TT1/UE1 1412.

At operation 1401-3, policy updating is performed. At operation 1401-3, the PCF 1418 transmits bridge management configuration information to an SMF 1417.

At operation 1401-4, PDU session modification for a PDU session of UE1 (DS-TT1 port, DS-TT port management information (FWD, etc.), NW-TT port, NW-TT port management information (FWD, etc.)) is performed. At operation 1401-4, the SMF 1417 transmits the bridge management configuration information to a DS-TT1/UE1 1412 and an NW-TT/UPF 1415 by using the PDU session modification process.

At operation 1401-5, the TSN AF 1419 retrieves port management information from the CNC 1421. At operation 1401-5, the TSN AF 1419 receives the port management information from the CNC 1421. Herein, the port management information includes scheduling (SCH) information of each port.

At operation 1401-6, an AF request procedure (DS-TT1 port, NW-TT ports (all)) is performed. At operation 1401-6, the TSN AF 1419 transmits the port management information to the PCF 1418. In this case, NW-TT/UPF 1415-relevant information may include a PDU session independency indication. In this case, if the information is the same as information already transmitted, the transmission may be omitted. If the transmission is omitted, at subsequent operation 1401-7, the NW-TT/UPF 1415 may be omitted, and operation 1401-9 may be omitted. Since the information is information which is transmitted for the first time and thus is not redundant information, the transmission is not omitted.

At operation 1401-7, policy updating is performed. At operation 1401-7, the PCF 1418 transmits port management information.

At operation 1401-8, PDU session modification for the PDU session for UE1 (DS-TT1 port management information) is performed. At operation 1401-8, the SMF 1417 transmits the port management information to the DS-TT1/UE1 1412 by using the PDU session modification procedure.

At operation 1401-9, N4 session modification (NW-TT port management information) is performed. At operation 1401-9, the SMF 1417 transmits the port management information to the NW-TT/UPF 1415 by using the N4 session modification procedure.

At operation 1402-1, the TSN AF 1419 retrieves traffic FWD information from the CNC 1421. At operation 1402-1, the TSN AF 1419 receives the traffic FWD information from the CNC 1421.

The TSN AF 1419 performs selection and an operation at the next operation is changed.

At operation 1402-2, an AF request procedure (DS-TT2 port) is performed. At operation 1402-2, the TSN AF 1419 transmits bridge management configuration information to the PCF 1418. In this case, if the DS-TT port is included in forwarding information, the forwarding information may be PDU session dependent information, and, if the forwarding information is traffic forwarding information independent from the DS-TT port, the forwarding information includes a PDU session independency indication. If the forwarding information is the same as information already transmitted, the transmission may be omitted. In this case, subsequent operations 1402-3 and 1402-4 may be omitted. Herein, it is assumed that the forwarding information includes a DS-TT2 port.

At operation 1402-3, policy updating is performed. At operation 1402-3, the PCF 1418 transmits bridge management configuration information to the SMF 1417.

At operation 1402-4, PDU session modification for a PDU session for UE2 (DS-TT2 port, DS-TT port management information (FWD, etc.), NW-TT port, NW-TT port management information (FWD, etc.)) is performed. At operation 1402-4, the SMF 1417 transmits bridge management configuration information to a DS-TT2/UE2 1413 and the NW-TT/UPF 1415 by using the PDU session modification process.

At operation 1402-5, the TSN AF 1419 retrieves port management information from the CNC 1421. At operation 1402-5, the TSN AF 1419 receives the port management information from the CNC 1421. Herein, the port management information may include scheduling (SCH) information of each port.

The TSN AF 1419 performs selection and an operation at the next operation is changed.

At operation 1402-6, an AF request procedure (DS-TT2 port, NW-TT ports (all)) is performed. At operation 1402-6, the TSN AF 1419 transmits port management information to the PCF 1418. In this case, NW-TT/UPF 1415-relevant information may include a PDU session independency indication. In this case, if the relevant information is the same as information already transmitted, the transmission may be omitted. If the transmission is omitted, the NW-TT/UPF 1415 may be omitted at subsequent operation 1402-7 and operation 1402-9 may be omitted.

At operation 1402-7, policy updating is performed. At operation 1402-7, the PCF 1418 transmits port management information.

At operation 1402-8, PDU session modification for a PDU session for UE2 (DS-TT2 port management information (for example, SCH, etc.)) is performed. At operation 1402-8, the SMF 1417 transmits the port management information to the DS-TT2/UE2 1413 by using the PDU session modification procedure.

At operation 1402-9, N4 session modification (NW-TT port management information (for example, SCH, etc.)) is performed. At operation 1402-9, the SMF 1417 transmits the port management information to the NW-TT/UPF 1415 by using the N4 session modification procedure.

Figure 15:
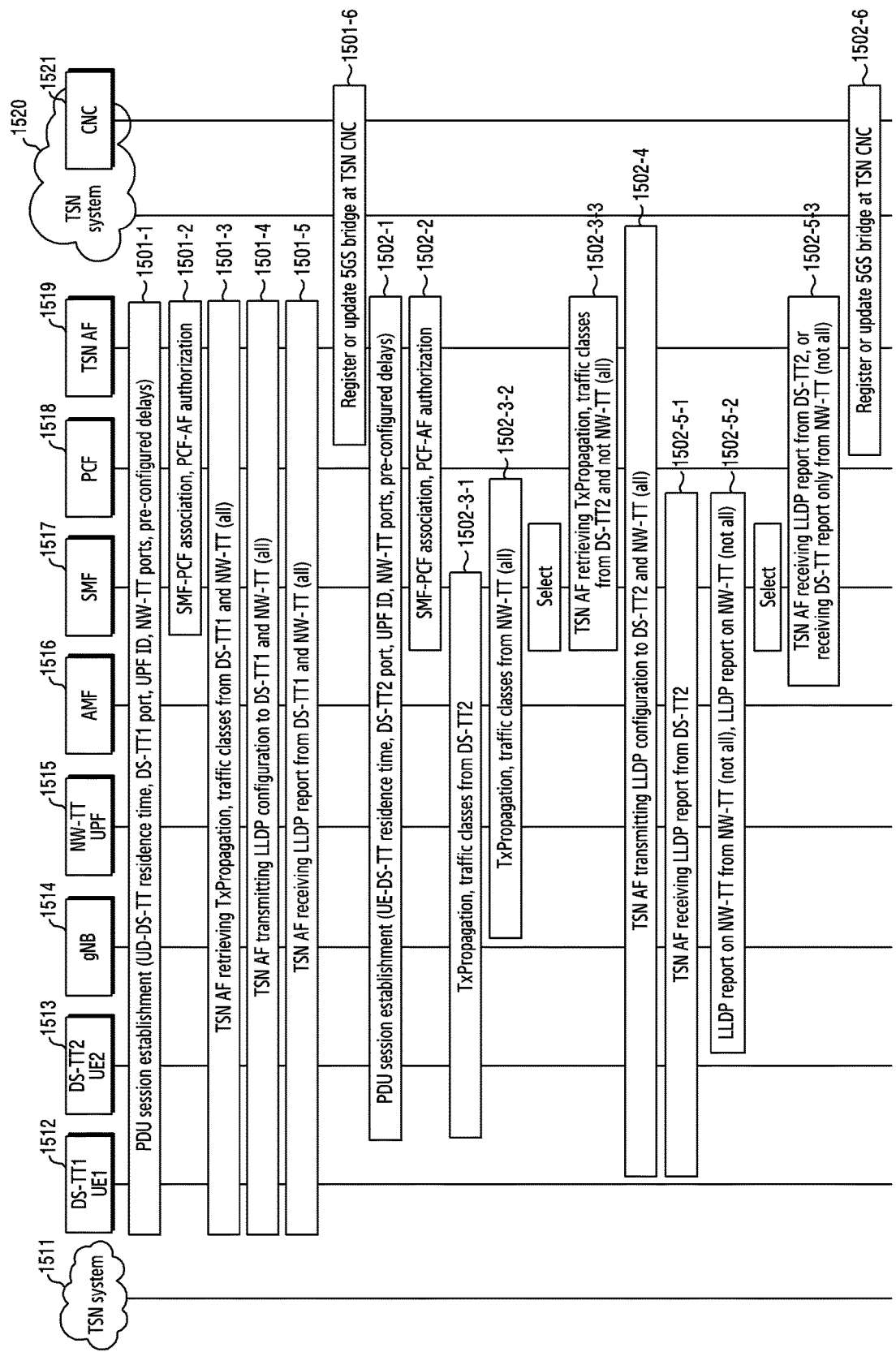
FIG. 15 is a view illustrating an operation of performing PDU session mapping with reference to a session management function (SMF) in a wireless communication system according to an embodiment of the disclosure.

FIG. 15 illustrates an operation of performing PDU session mapping with reference to an SMF in a wireless communication system according to an embodiment of the disclosure.

Figure 8A:
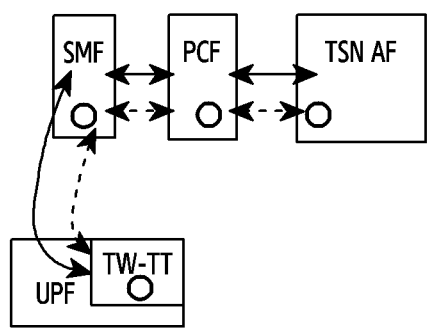
FIGS. 8A, 8B, 8C, 8D, 8E and 8F are views illustrating various scenarios to which a suggested method is applied in a wireless communication system according to various embodiments of the disclosure.
Figure 8B:
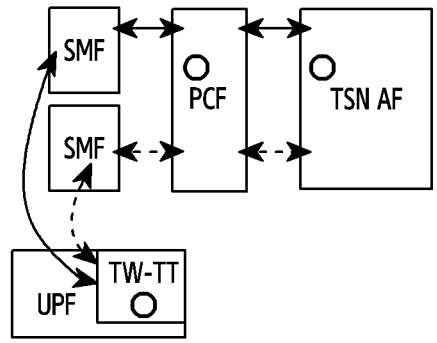

This process relates to a process of reporting bridge management information, and may be used in the scenarios of FIGS. 8A and 8B. This method has an advantage that a PDU session mapping function of a reporting process is distributed to an NW-TT/UPF 1515 and an SMF 1517 and a load of each unit is reduced.

In FIG. 15, TSN system 1511, DS-TT1/UE1 1512, DS-TT2/UE2 1513, gNB 1514, NW-TT/UPF 1515, AMF 1516, SMF 1517, PCF 1518, TSN AF 1519, TSN system 1520, and CNC 1521 operate in a wireless communication system.

Referring to FIG. 15, at operation 1501-1, PDU session establishment (UD-DS-TT residence time, DS-TT1 port, UPF ID, NW-TT ports, pre-configured delays) is performed. At operation 1501-1, a DS-TT1/UE1 1512 and the NW-TT/UPF 1515 are associated with each other in a process of establishing a PDU session for the DS-TT1/UE1 1512, and corresponding information is stored in a TSN AF 1519. The stored information may include UD-DS-TT residence time, a UPF ID of the DS-TT1/UE1 1512.

At operation 1501-2, SMF-PCF association, PCF-AF authorization are performed. At operation 1501-2, policy information updating between the SMF 1517 and a PCF 1518 is performed in relation to a PDU session. Through this process, a subscription is made to an event of TxPropagationDelay, an LLDP result, etc., and authorization is performed with respect to a notification of the corresponding event between the PCF 1518 and the TSN AF 1519.

At operation 1501-3, the TSN AF 1519 retrieves TxPropagationDelay, traffic classes from the DS-TT1/UE1 1512 and the NW-TT/UPF 1515 (all). At operation 1501-3, the DS-TT1/UE1 1512 and the NW-TT/UPF 1515 transmit information of TxPropagationDelay and supporting traffic class to the TSN AF 1519. In this case, when the NW-TT/UPF 1515 transmits the information of TxPropagationDelay and supporting traffic class, the information may include an indication specifying PDU session independency.

At operation 1501-4, the TSN AF 1519 transmits an LLDP configuration to the DS-TT1 and the NW-TT (all). At operation 1501-4, the TSN AF 1519 transmits the LLDP configuration to the DS-TT/UE1 1512 and the NW-TT/UPF 1515. An LLDP of the DS-TT1/UE1 1512 may be directly performed by the DS-TT1/UE1 1512 or may be performed by the NW-TT/UPF 1515 on behalf of the DS-TT1/UE1 1512. An LLDP of the NW-TT/UPF 1515 is performed by the NW-TT/UPF 1515. In this case, information regarding the LLDP of the NW-TT/UPF 1515 may include an indication specifying PDU session independency.

At operation 1501-5, the TSN AF 1519 receives an LLDP report from the DS-TT1 and the NW-TT (all). At operation 1501-5, the DS-TT1/UE1 1512 and the NW-TT/UPF 1515 transmit, to the TSN AF 1519, a result of the LLDP, that is, MAC addresses of neighboring nodes connected to a port of the DS-TT1/UE1 1512 and MAC addresses of neighboring nodes connected for each port of the NW-TT/UPF 1515. In this case, information regarding the LLDP result of the NW-TT/UPF 1515 may include an indication specifying PDU session independency.

At operation 1501-6, the TSN AF 1519 registers or updates a 5GS bridge at a TSN CNC 1521 of TSN system 1520. At operation 1501-6, the TSN AF 1519 transmits 5GS bridge-relevant information to the TSN CNC 1521 of the TSN system 1520. This information may include a 5GS bridge ID, port information of the DS-TT1 and the NW-TT, bridge delay information per supporting traffic class (TC) between a pair of ports, neighboring node information of each port.

At operation 1502-1, PDU session establishment (UE-DS-TT residence time, DS-TT2 port, UPF ID, NW-TT ports, pre-configured delays) is performed. At operation 1502-1, a DS-TT2/UE2 1513 and the NW-TT/UPF 1515 are associated with each other in a process of establishing a PDU session for the DS-TT2/UE2 1513, and corresponding information is stored in the TSN AF 1519. The stored information may include UD-DS-TT residence time of the DS-TT2/UE2 1513, UPF ID, etc.

At operation 1502-2, SMF-PCF association, PCF-AF authorization are performed. At operation 1502-2, policy information updating between the SMF 1517 and the PCF 1518 is performed in relation to the PDU session. Through this process, a subscription is made to an event of TxPropagationDelay, an LLDP result, etc., and authorization is performed with respect to a notification of the corresponding event between the PCF 1518 and the TSN AF 1519.

At operation 1502-3-1, information of TxPropagationDelay, traffic classes is transmitted from the DS-TT2/UE2 1513. At operation 1502-3-1, the DS-TT2/UE2 1513 transmits information of TxPropagationDelay and supporting traffic class to the SMF 1517.

At operation 1502-3-2, the information of TxPropagationDelay, traffic classes is transmitted from the NW-TT/UPF 1515 (all). At operation 1502-3-2, the NW-TT/UPF 1515 transmits the information of TxPropagationDelay and supporting traffic class to the SMF 1517. In this case, the information may include an indication specifying PDU session independency.

The SMF 1517 performs selection and an operation at the next operation is changed.

At operation 1502-3-3, the TSN AF 1519 retrieves TxPropagationDelay, traffic classes from the DS-TT2/UE2 1513 and the NW-TT/UPF 1515 (all). At operation 1502-3-3, the SMF 1517 transmits, to the TSN AF 1519, information of TxPropagationDelay and supporting traffic class from the DS-TT2/UE2 1513 and information of TxPropagationDelay and supporting traffic class from the NW-TT/UPF 1515. In this case, if the information from the NW-TT/

UPF 1515 has no difference from the information already transmitted for the PDU session 1, the information from the NW-TT/UPF 1515 may be omitted.

At operation 1502-4, the TSN AF 1519 transmits an LLDP configuration to the DS-TT2/UE2 1513 and the NW-TT/UPF 1515 (all). At operation 1502-4, the TSN AF 1519 transmits the LLDP configuration to the DS-TT2/UE2 1513 and the NW-TT/UPF 1515. An LLDP of the DS-TT2/UE2 1513 may be directly performed by the DS-TT2/UE2 1513, or may be performed by the NW-TT/UPF 1515 on behalf of the DS-TT2/UE2 1513. An LLDP of the NW-TT/UPF 1515 is performed by the NW-TT/UPF 1515. In this case, information regarding the LLDP of the NW-TT/UPF 1515 may include an indication specifying PDU session independency. In this case, if the LLDP configuration information has no difference from the information already transmitted for the PDU session 1, the TSN AF may omit this transmission.

At operation 1502-5-1, the TSN AF 1519 receives an LLDP report from the DS-TT2/UE2 1513. At operation 1502-5-1, the DS-TT2/UE2 1513 transmits, to the SMF 1517, a result of the LLDP, that is, MAC addresses of neighboring nodes connected to a port of the DS-TT2/UE2 1513.

At operation 1502-5-2, an LLDP report regarding the NW-TT/UPF 1515, an LLDP report regarding the DS-TT2/UE2 1513 and the NW-TT/UPF 1515 (all) are transmitted from the NW-TT/UPF 1515 (all). At operation 1502-5-2, the NW-TT/UPF 1515 transmits, to the SMF 1517, a result of the LLDP, that is, MAC addresses of neighboring nodes connected to each port of the NW-TT/UPF 1515. In this case, information regarding the LLDP result of the NW-TT/UPF 1515 may include an indication specifying PDU session independency. If the NW-TT/UPF 1515 performs the LLDP of the DS-TT2/UE2 1513, MAC addresses of neighboring nodes connected to the port of the DS-TT2/UE2 1513 are also transmitted to the SMF 1517 at this operation.

The SMF 1517 performs selection and an operation at the next operation is changed.

At operation 1502-5-3, the TSN AF 1519 receives an LLDP report from the DS-TT2/UE2 1513, or receives a report of the DS-TT 2/UE2 1513 only from the NW-TT/UPF 1515 (all). At operation 1502-5-3, when information obtained at operation 1502-5-1 or operation 1502-5-2 or two pieces of information arrive within a predetermined time, the SMF 1517 collects the two pieces of information and transmits the information to the TSN AF 1519. In this case, if there is no difference from the information already transmitted regarding the PDU session 1, the transmission of the LLDP result of the NW-TT/UPF 1515 may be omitted.

At operation 1502-6, the TSN AF 1519 registers or updates a 5GS bridge at the TSN CNC 1521. At operation 1502-6, the TSN AF 1519 transmits 5GS bridge-relevant information to the TSN CNC 1521 of the TSN system 1520. This information may include a 5GS bridge ID, port information of the DS-TT2/UE2 1513 and the NW-TT/UPF 1515, bridge delay information per supporting traffic class between a pair of ports, and neighboring node information of each port.

Figure 16:
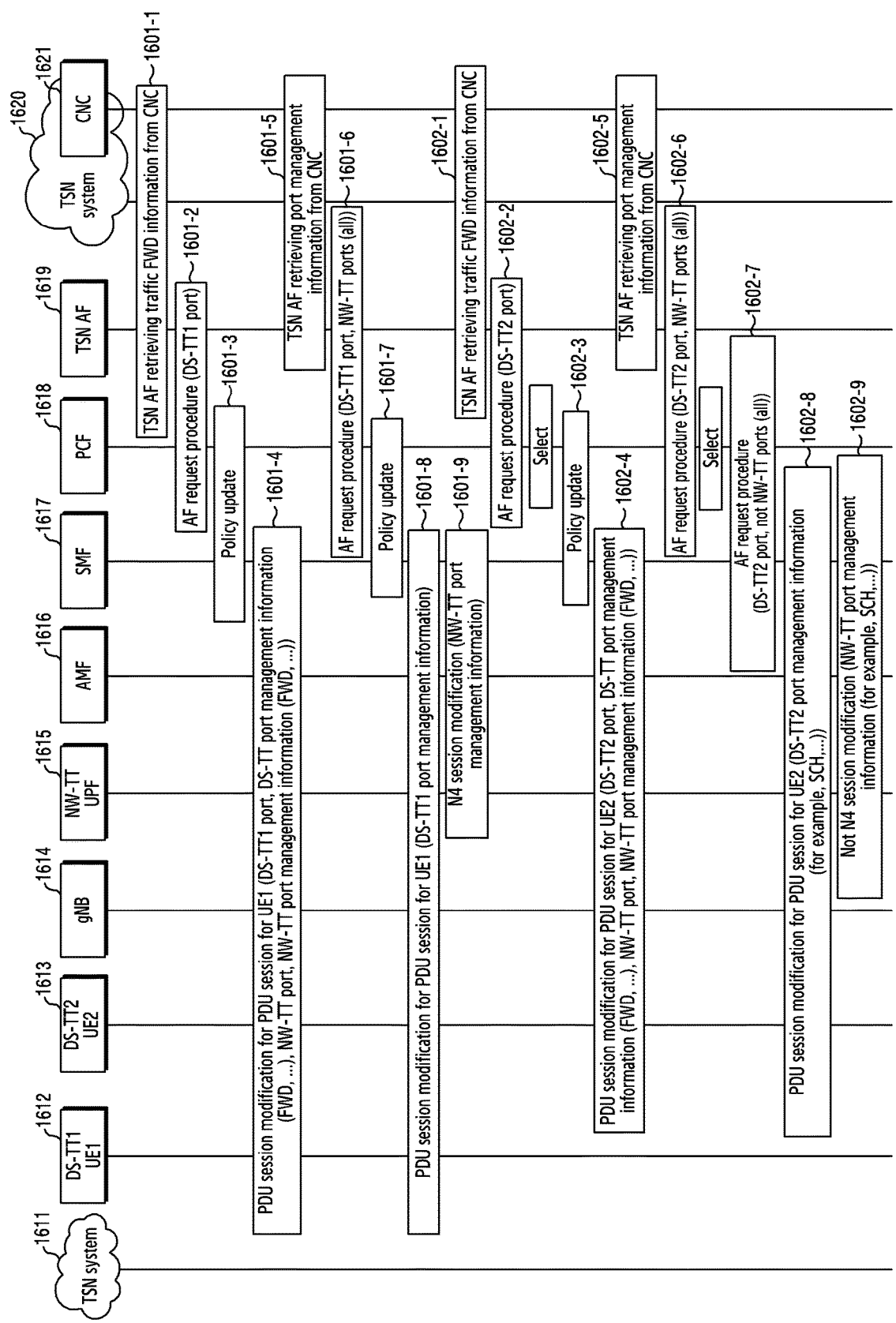
FIG. 16 is a view illustrating a process of performing PDU session mapping with reference to a policy control function (PCF) in a wireless communication system according to an embodiment of the disclosure.

FIG. 16 illustrates a process of performing PDU session mapping with reference to a PCF in a wireless communication system according to an embodiment of the disclosure.

Figure 8C:
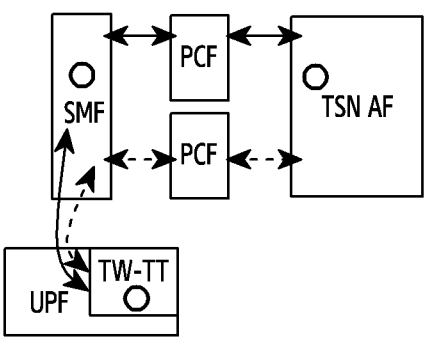
Figure 8D:
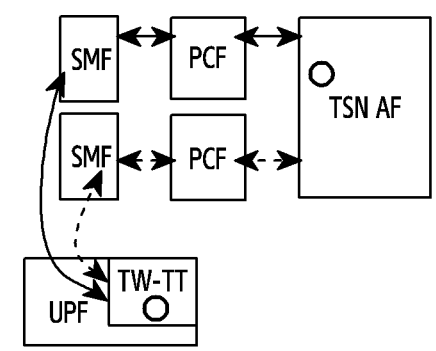

This process relates to a process of configuring bridge management information, and may be used in the scenarios of FIGS. 8A and 8C. This method had an advantage that a PDU session mapping function of the configuration process is distributed to a TSN AF 1619 and a PCF 1618, and a load of each unit is reduced.

In FIG. 16, TSN system 1611, DS-TT1/UE1 1612, DS-TT2/UE2 1613, gNB 1614, NW-TT/UPF 1615, AMF 1616, SMF 1617, PCF 1618, TSN AF 1619, TSN system 1620, and CNC 1621 operate in a wireless communication system.

Referring to FIG. 16, at operation 1601-1, the TSN AF 1619 retrieves traffic FWD information from a CNC 1621 of TSN system 1620. At operation 1601-1, the TSN AF 1619 receives the traffic FWD information from the CNC 1621 of TSN system 1620.

At operation 1601-2, an AF request procedure (DS-TT1 port) is performed. At operation 1601-2, the TSN AF 1619 transmits bridge management configuration information to the PCF 1618. In this case, if the traffic FWD information includes a DS-TT port, the traffic FWD information is PDU session dependent information, and, if the traffic FWD information is independent from the DS-TT port, the traffic FWD information includes a PDU session independency indication. If the traffic FWD information is the same as information already transmitted, the transmission may be omitted. In this case, subsequent operations 1601-3 and 1601-4 may be omitted. Herein, since the traffic FWD information is information that is transmitted for the first time and is not redundant information, operations 1601-3 and 1601-4 are not omitted. Herein, it is assumed that the traffic FWD information is information including the port of the DS-TT1/UE1 1612.

At operation 1601-3, policy updating is performed. At operation 1601-3, the PCF 1618 transmits bridge management configuration information to an SMF 1617.

At operation 1601-4, PDU session modification for a PDU session for UE1 (DS-TT1 port, DS-TT port management information (FWD, etc.), NW-TT port, NW-TT port management information (FWD, etc.)) is performed. At operation 1601-4, the SMF 1617 transmits the bridge management configuration information to a DS-TT1/UE1 1612 and an NW-TT/UPF 1615 by using the PDU session modification process.

At operation 1601-5, the TSN AF 1619 retrieves port management information from the CNC 1621. At operation 1601-5, the TSN AF 1619 receives the port management information from the CNC 1621. Herein, the port management information includes scheduling information of each port.

At operation 1601-6, an AF request procedure (DS-TT1 port, NW-TT ports (all)) is performed. At operation 1601-6, the TSN AF 1619 transmits the port management information to the PCF 1618. In this case, NW-TT/UPF 1615-relevant information may include a PDU session independency indication. In this case, if the information is the same as information already transmitted, the transmission may be omitted. If the transmission is omitted, the NW-TT/UPF 1615 may be omitted at the next operation 1601-7 and operation 1601-8 may be omitted. Herein, since the information is information that is transmitted for the first time and is not redundant information, the transmission is not omitted.

At operation 1601-7, policy updating (DS-TT1 port, NW-TT ports (all)) is performed. At operation 1601-7, the PCF 1618 transmits the port management information.

At operation 1601-8, PDU session modification for a PDU session for UE1 (DS-TT1 port management information) is performed. At operation 1601-8, the SMF 1617 transmits the port management information to the DS-TT1/UE1 1612 by using the PDU session modification procedure.

At operation 1601-9, N4 session modification (NW-TT port management information) is performed. At operation 1601-8, the SMF 1617 transmits the port management information to the NW-TT/UPF 1615 by using the N4 session modification procedure.

At operation 1602-1, the TSN AF 1619 retrieves traffic FWD information from the CNC 1621. At operation 1602-1, the TSN AF 1619 receives the traffic FWD information from the CNC 1621.

At operation 1602-2, an AF request procedure (DS-TT2 port) is performed. At operation 1602-2, the TSN AF 1619 transmits bridge management configuration information to the PCF 1618. In this case, if traffic forwarding information includes a DS-TT port, the traffic forwarding information may be PDU session dependent information, and, if the traffic forwarding information is independent from the DS-TT port, the traffic forwarding information may include a PDU session independency indication.

The PCF 1618 performs selection and an operation at the next operation is changed.

At operation 1602-3, policy updating is performed. At operation 1602-3, the PCF 1618 transmits bridge management configuration information to the SMF 1617. If the traffic forwarding information is independent from the DS-TT port, the traffic forwarding information includes a PDU session independency indication. At this operation, if the information is the same as information already transmitted, the transmission may be omitted. In this case, subsequent operation 1602-4 may be omitted.

At operation 1602-4, PDU session modification for a PDU session for UE2 (DS-TT2 port, DS-TT port management information (FWD, etc.), NW-TT port, NW-TT port management information (FWD, etc.)) is performed. At operation 1602-4, the SMF 1617 transmits bridge management configuration information to the DS-TT and the NW-TT by using the PDU session modification process.

At operation 1602-5, the TSN AF 1619 retrieves port management information from the CNC 1621. At operation 1602-5, the TSN AF 1619 receives the port management information from the CNC 1621. Herein, the port management information includes scheduling information of each port.

At operation 1602-6, an AF request procedure (DS-TT2 port, NW-TT ports (all)) is performed. At operation 1602-6, the TSN AF 1619 transmits the port management information to the PCF 1618. In this case, NW-TT/UPF 1615-relevant information may include a PDU session independency indication.

At operation 1602-7, policy updating (DS-TT2 port, NW-TT ports (all)) is performed. At operation 1602-7, the PCF 1618 transmits the port management information. In this case, the NW-TT/UPF 1615-relevant information may include a PDU session independency indication. In this case, if the information is the same as information already transmitted, the transmission may be omitted. If the transmission is omitted, subsequent operation 1602-9 may be omitted.

At operation 1602-8, PDU session modification for the PDU session for UE2 (DS-TT2 port management information (for example, scheduling, etc.)) is performed. At operation 1602-8, the SMF 1617 transmits the port management information to a DS-TT2/UE2 1613 by using the PDU session modification procedure.

At operation 1602-9, N4 session modification (NW-TT port management information (for example, SCH, etc.)) is performed. At operation 1602-9, the SMF 1617 transmits the port management information to the NW-TT/UPF 1615 by using the N4 session modification procedure.

Figure 17:
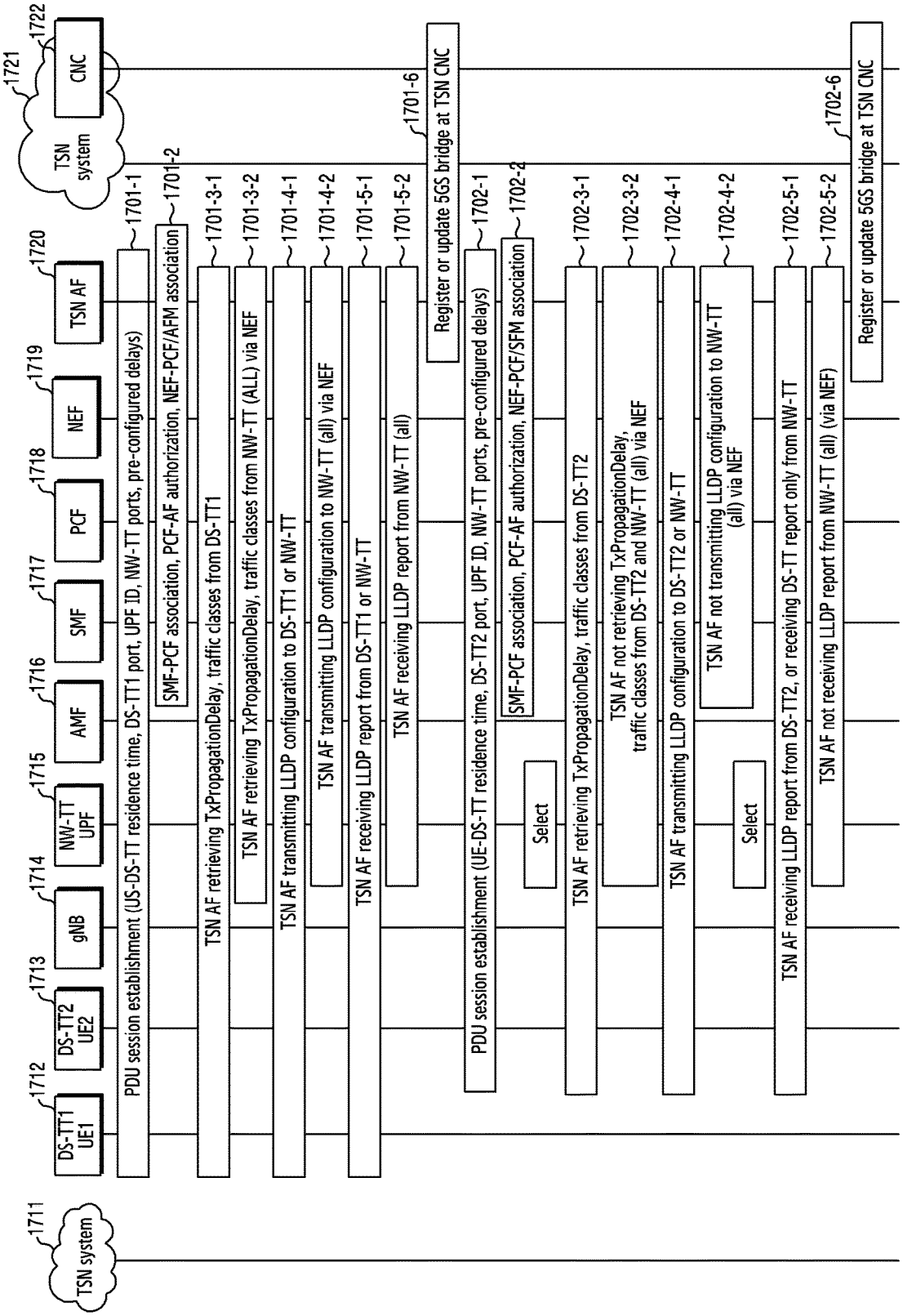
FIG. 17 is a view illustrating a process of performing PDU session mapping with reference to an NW-TT/UPF when a network exposure function (NEF) is used in a wireless communication system according to an embodiment of the disclosure.

FIG. 17 illustrates a process of performing PDU session mapping with reference to an NW-TT/UPF when a network exposure function (NEF) is used in a wireless communication system according to an embodiment of the disclosure.

Figure 8E:
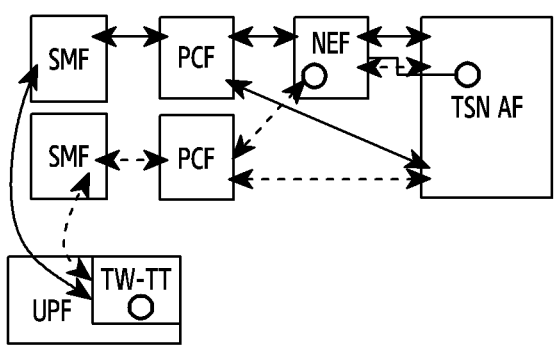
Figure 8F:
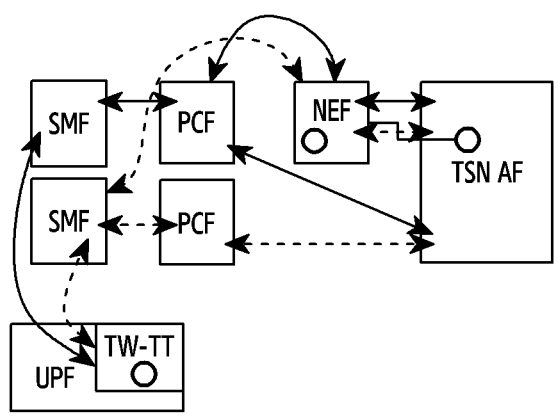

This process relates to a process of reporting bridge management information, and may be used in the scenarios of FIGS. 8E and 8F. This method has an advantage that a transmission path of PDU session independency information of a reporting process is separated from a transmission path of PDU session dependent information.

In FIG. 17, TSN system 1711, DS-TT1/UE1 1712, DS-TT2/UE2 1713, gNB 1714, NW-TT/UPF 1715, AMF 1716, SMF 1717, PCF 1718, NEF 1719, TSN AF 1720, TSN system 1721, and CNC 1722 operate in a wireless communication system.

Referring to FIG. 17, at operation 1701-1, PDU session establishment (UD-DS-TT residence time, DS-TT1 port, UPF ID, NW-TT ports, pre-configured delays) is performed. At operation 1701-1, a DS-TT1/UE1 1712 and an NW-TT/UPF 1715 are associated with each other in a process of establishing a PDU session for the DS-TT1/UE1 1712, and corresponding information is stored in a TSN AF 1720. The stored information may include UE-DE-TT residence time, a UPF ID of the DS-TT1/UE1 1712.

At operation 1701-2, SMF-PCF association, PCF-AF authorization, NEF-PCF/AMF association are performed. At operation 1701-2, policy information updating between an SMF 1717 and a PCF 1718 is performed in relation to a PDU session. Through this process, a subscription is made to an event of TxPropagationDelay, an LLDP result, etc., and authorization of the subscription to the corresponding event between the PCF 1718 and the TSN AF 1720 is performed. In this process, the PCF 1718 or the SMF 1717 and the NEF 1719 are associated with each other, and an NEF 1719 and the TSN AF 1720 are associated with each other.

At operation 1701-3-1, the TSN AF 1720 retrieves TxPropagationDelay, traffic classes from the DS-TT1/UE1 1712. At operation 1701-3-1, the DS-TT1/UE1 1712 transmits information of TxPropagationDelay and supporting traffic classes to the TSN AF 1720 without passing through the NEF 1719.

At operation 1701-3-2, the TSN AF 1720 retrieves TxPropagationDelay, traffic classes from the NW-TT/UPF 1715 (all) via the NEF 1719. At operation 1701-3-2, the NW-TT/UPF 1715 transmits information of TxPropagationDelay and supporting traffic classes to the TSN AF 1720 via the NEF 1719. In this case, when the NW-TT/UPF 1715 transmits the information of TxPropagationDelay and supporting traffic classes, the information may include an indication specifying PDU session independency.

At operation 1701-4-1, the TSN AF 1720 transmits an LLDP configuration to the DS-TT1/UE1 1712 or the NW-TT/UPF 1715. At operation 1701-4-1, the TSN AF 1720 transmits the LLDP configuration regarding the DS-TT1/UE1 1712 to the DS-TT1/UE1 1712 or the NW-TT/UPF 1715 without passing through the NEF 1719. An LLDP of the DS-TT1/UE1 1712 may be directly performed by the DS-TT1/UE1 1712 or may be performed by the NW-TT/UPF 1715 on behalf of the DS-TT1/UE1 1712.

At operation 1701-4-2, the TSN AF 1720 transmits an LLDP configuration to the NW-TT/UPF 1715 (all) via the NEF 1719. At operation 1701-4-2, the TSN AF 1720 transmits the LLDP configuration regarding the NW-TT/UPF 1715 to the NW-TT/UPF 1715 via the NEF 1719. An LLDP of the NW-TT/UPF 1715 is performed by the NW-TT/UPF 1715. In this case, information regarding the LLDP of the NW-TT/UPF 1715 may include an indication specifying PDU session independency.

At operation 1701-5-1, the TSN AF 1720 receives an LLDP report from the DS-TT1/UE1 1712 or the NW-TT/UPF 1715. At operation 1701-5-1, the DS-TT1/UE1 1712 or the NW-TT/UPF 1715 transmits, to the TSN AF 1720 without passing through the NEF 1719, a result of the LLDP of the DS-TT1/UE1 1712, that is, MAC addresses of neighboring nodes connected to a port of the DS-TT1/UE1 1712.

At operation 1701-5-2, the TSN AF 1720 receives an LLDP report from the NW-TT/UPF 1715 (all). At operation 1701-5-2, the NW-TT/UPF 1715 transmits, to the TSN AF 1720 (SMF 1717) via the NEF 1719, a result of the LLDP of the NW-TT/UPF 1715, that is, MAC addresses of neighboring nodes connected to each port of the NW-TT/UPF 1715. In this case, information regarding the result of the LLDP of the NW-TT/UPF 1715 may include an indication specifying PDU session independency.

At operation 1701-6, the TSN AF 1720 registers or updates a 5GS bridge at a TSN CNC 1722 of TSN system 1721. At operation 1701-6, the TSN AF 1720 transmits 5GS bridge-relevant information to the TSN CNC 1722 of the TSN system 1721. This information includes a 5GS bridge ID, port information of the DS-TT1/UE1 1712 and the NW-TT/UPF 1715, bridge delay information per supporting traffic class between a pair of ports, and neighboring node information of each port.

At operation 1702-1, PDU session establishment (UE-DS-TT residence time, DS-TT2 port, UPF ID, NW-TT ports, pre-configured delays) is performed. At operation 1702-1, a DS-TT2/UE2 1713 and the NW-TT/UPF 1715 are associated with each other in a process of establishing a PDU session for the DS-TT/UE2 1713, and corresponding information is stored in the TSN AF 1720. The stored information includes UE-DS-TT residence time of the DS-TT2/UE2 1713, a UPF ID, etc.

At operation 1702-2, SMF-PCF association, PCF-AF authorization, NEF-PCF/SMF association are performed. At operation 1702-2, policy information updating between the SMF 1717 and the PCF 1718 is performed in relation to the PDU session. Through this process, a subscription is made to an event of TxPropagationDelay, an LLDP result, and authorization is performed with respect to a notification of the corresponding event between the PCF 1718 and the TSN AF 1720. In this process, the PCF 1718 or the SMF 1717 and the NEF 1719 are associated with each other, and the NEF 1719 and the TSN AF 1720 are associated with each other.

The NW-TT/UPF 1715 performs selection and an operation at the next operation is changed.

At operation 1702-3-1, the TSN AF 1720 retrieves TxPropagationDelay, traffic classes from the DS-TT2/UE2 1713. At operation 1702-3-1, the DS-TT2/UE2 1713 transmits information of TxPropagationDelay and supporting traffic classes to the TSN AF 1720 without passing through the NEF 1719.

At operation 1702-3-2, the TSN AF 1720 retrieves TxPropagationDelay, traffic classes from the DS-TT2/UE2 1713 and the NW-TT (all) via the NEF 1719. At operation 1702-3-2, the NW-TT/UPF 1715 transmits information of TxPropagationDelay and supporting traffic classes to the TSN AF 1720 via the NEF 1719. In this case, the information may include an indication specifying PDU session independency. In this case, if information from the NW-TT/UPF 1715 has no difference from the information already transmitted for the PDU session 1, the information from the NW-TT/UPF 1715 may be omitted.

At operation 1702-4-1, the TSN AF 1720 transmits an LLDP configuration to the DS-TT2/UE2 1713 or the NW-TT/UPF 1715. At operation 1702-4-1, the TSN AF 1720 transmits the LLDP configuration regarding the DS-TT2/UE2 1713 to the DS-TT2/UE2 1713 or the NW-TT/UPF 1715 without passing through the NEF 1719. An LLDP of the DS-TT2/UE2 1713 may be directly performed by the DS-TT2/UE2 1713, or may be performed by the NW-TT/UPF 1715 on behalf of the DS-TT2/UE2 1713.

At operation 1702-4-2, the TSN AF 1720 transmits an LLDP configuration to the NW-TT/UPF 1715 (all) via the NEF 1719. At operation 1702-4-2, the TSN AF 1720 transmits an LLDP configuration regarding the NW-TT/UPF 1715 to the NW-TT/UPF 1715 via the NEF 1719. An LLDP of the NW-TT/UPF 1715 is performed by the NW-TT/UPF 1715. In this case, information regarding the LLDP of the NW-TT/UPF 1715 may include an indication specifying PDU session independency. In this case, if the LLDP configuration information has no difference from the information already transmitted for the PDU session 1, the TSN AF 1720 may omit this transmission.

The NW-TT/UPF 1715 performs selection and an operation at the next operation is changed.

At operation 1702-5-1, the TSN AF 1720 receives an LLDP report from the DS-TT2/UE2 1713, or receives a DS-TT report only from the NW-TT/UPF 1715. At operation 1702-5-1, the DS-TT2/UE2 1713 transmits, to the TSN AF 1720 without passing through the NEF 1719, a result of the LLDP of the DS-TT2/UE2 1713, that is, MAC addresses of neighboring nodes connected to a port of the DS-TT2/UE2 1713.

At operation 1702-5-2, the TSN AF 1720 receives an LLDP report from the NW-TT/UPF 1715 (all) (via the NEF 1719). At operation 1702-5-2, the NW-TT/UPF 1715 transmits, to the TSN AF 1720 (SMF 1717) via the NEF 1719, a result of the LLDP of the NW-TT/UPF 1715, that is, MAC addresses of neighboring nodes connected for each port of the NW-TT/UPF 1715. In this case, information regarding the LLDP result of the NW-TT/UPF 1715 may include an indication specifying PDU session independency. In this case, if there is no difference from the information already transmitted for the PDU session 1, the transmission of the LLDP result of the NW-TT/UPF 1715 may be omitted.

At operation 1702-6, the TSN AF 1720 registers or updates a 5GS bridge at the TSN CNC 1722. At operation 1702-6, the TSN AF 1720 transmits 5GS bridge-relevant information to the TSN CNC 1722 of the TSN. This information may include a 5GS bridge ID, port information of the DS-TT2/UE2 1713 and the NW-TT/UPF 1715, bridge delay information per supporting traffic class between a pair of ports, and neighboring node information of each port.

Figure 18:
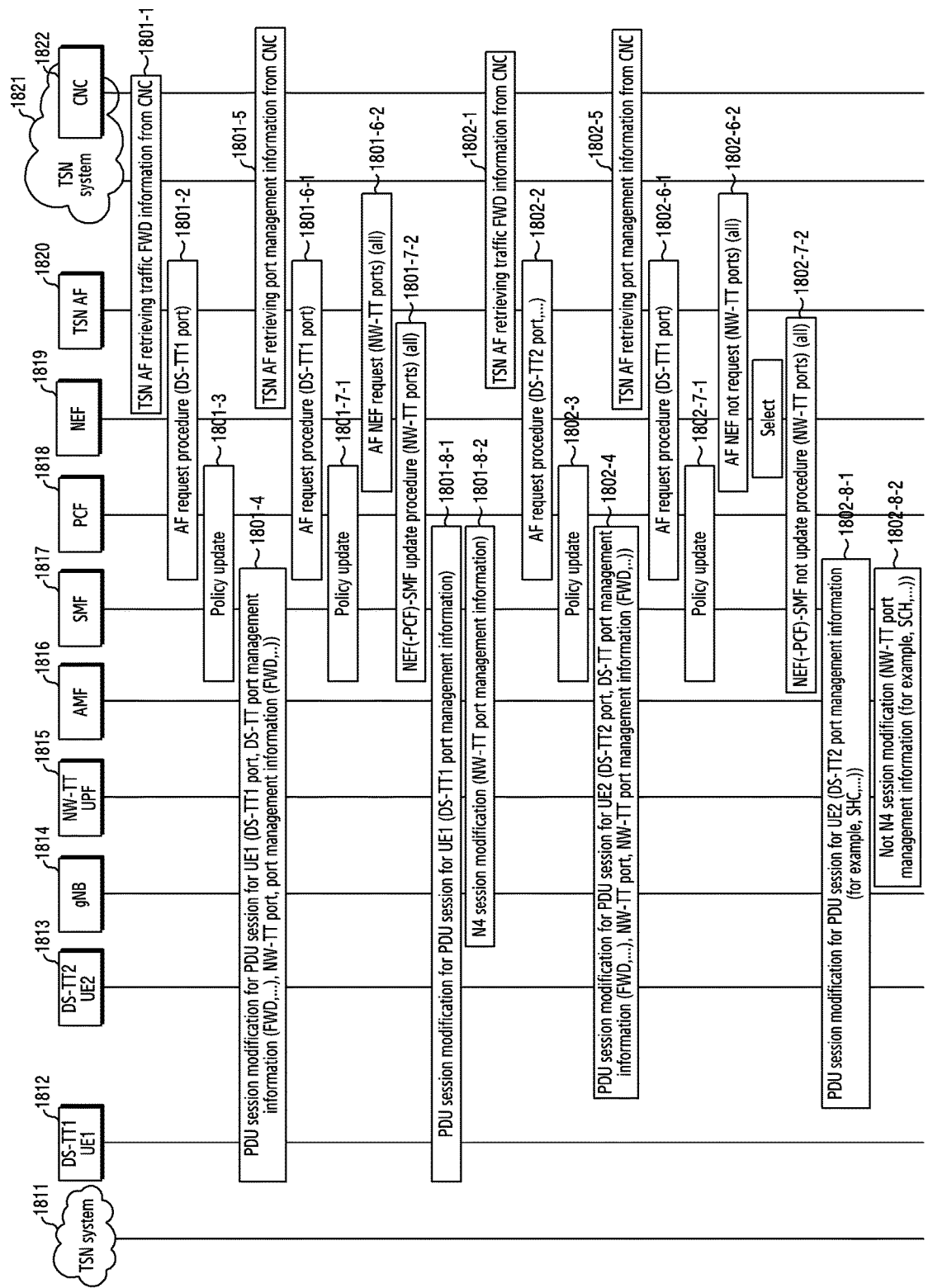
FIG. 18 is a view illustrating a process of performing PDU session mapping with reference to an NEF when the NEF is used in a wireless communication system according to an embodiment of the disclosure.

FIG. 18 illustrates a process of performing PDU session mapping with reference to an NEF when the NEF is used in a wireless communication system according to an embodiment of the disclosure.

This process relates to a process of configuring bridge management information, and may be used in the scenarios of FIGS. 8E and 8F. This method has an advantage that a transmission path of PDU session independency information in a configuration process is separated from a transmission path of PDU session dependent information.

In FIG. 18, TSN system 1811, DS-TT1/UE1 1812, DS-TT2/UE2 1813, gNB 1814, NW-TT/UPF 1815, AMF

1816, SMF 1817, PCF 1818, NEF 1819, TSN AF 1820, TSN system 1821, and CNC 1822 operate in a wireless communication system.

Referring to FIG. 18, at operation 1801-1, a TSN AF 1820 retrieves traffic FWD information from a CNC 1822 of TSN system 1821. At operation 1801-1, the TSN AF 1820 receives the traffic FWD information from the CNC 1822 of TSN system 1821.

At operation 1801-2, an AF request procedure (DS-TT1 port) is performed. At operation 1801-2, the TSN AF 1820 transmits bridge management configuration information to a PCF 1818. In this case, if the traffic FWD information includes a DS-TT port, the traffic FWD information may be PDU session dependent information, and, if the traffic FWD information is independent from the DS-TT port, the information may be transmitted to an NEF 1819 instead of the PCF 1818 and may include a PDU session independency indication. If the information is the same as information already transmitted, the transmission may be omitted. In this case, subsequent operations 1801-3 and 1801-4 may be omitted. Herein, since the information is information that is transmitted for the first time and is not redundant information, operations 1801-3 and 1801-4 are not omitted. Herein, it is assumed that the traffic FWD information is information that includes a port of a DS-TT1/UE1 1812.

At operation 1801-3, policy updating is performed. At operation 1801-3, the PCF 1818 transmits bridge management configuration information to an SMF 1817.

At operation 1801-4, PDU session modification for a PDU session for UE1 (DS-TT1 port, DS-TT port management information (FWD, etc.), NW-TT port, port management information (FWD, etc.) is performed. At operation 1801-4, the SMF 1817 transmits bridge management configuration information to the DS-TT1/UE1 1812 and an NW-TT/UPF 1815.

At operation 1801-5, the TSN AF 182 retrieves port management information from the CNC 1822. At operation 1801-5, the TSN AF 1820 receives the port management information from the CNC 1822. Herein, the port management information may include scheduling information of each port.

At operation 1801-6-1, an AF request procedure (DS-TT1 port) is performed. At operation 1801-6-1, the TSN AF 1820 transmits port management information regarding the DS-TT1/UE1 1812 to the PCF 1818.

At operation 1801-6-2, an AF-NEF request (NW-TT ports) (all) is performed. At operation 1801-6-2, the TSN AF 1820 transmits the port management information regarding the NW-TT/UPF 1815 to the NEF 1819. In this case, NW-TT/UPF 1815-relevant information may include a PDU session independency indication. In this case, if the information is the same as information already transmitted, the transmission may be omitted. If the transmission is omitted, subsequent operations 1801-7-2 and 1801-8-2 may be omitted. Herein, since the information is information that is transmitted for the first time and is not redundant information, the transmission is not omitted.

At operation 1801-7-1, policy updating is performed. At operation 1801-7-1, the PCF 1818 transmits the port management information regarding the DS-TT1/UE1 1812 to the SMF 1817.

At operation 1801-7-2, an NEF (-PCF)-SMF update procedure (NW-TT ports) (all) is performed. At operation 1801-7-2, the NEF 1819 transmits port management information regarding the NW-TT/UPF 1815 to the SMF 1817.

At operation 1801-8-1, PDU session modification for a PDU session for UE1 (DS-TT1 port management information) is performed. At operation 1801-8-1, the SMF 1817 transmits port management information to the DS-TT1/UE1 1812 by using the PDU session modification procedure.

At operation 1801-8-2, N4 session modification (NW-TT port management information) is performed. At operation 1801-8-2, the SMF 1817 transmits port management information to the NW-TT/UPF 1815 by using the N4 session modification procedure.

At operation 1802-1, the TSN AF 1820 retrieves traffic FWD information from the CNC 1822. At operation 1802-1, the TSN AF 1820 receives the traffic FWD information from the CNC 1822.

At operation 1802-2, an AF request procedure (DS-TT2 port, etc.) is performed. At operation 1802-2, the TSN AF 1820 transmits bridge management configuration information to the PCF 1818. In this case, if the traffic FWD information includes the DS-TT port, the traffic FWD information may be PDU session dependent information, and if the traffic FWD information is independent from the DS-TT port, the information is transmitted to the NEF 1819 instead of the PCF 1818, and includes a PDU session independency indication. If the information is the same as information already transmitted, the transmission may be omitted. If the transmission is omitted, subsequent operations 1802-3 and 1802-4 may be omitted. Herein, it is assumed that the information is information including the DS-TT2 port.

At operation 1802-3, policy updating is performed. At operation 1802-3, the PCF 1818 transmits bridge management configuration information to the SMF 1817.

At operation 1802-4, PDU session modification for a PDU session for UE2 (DS-TT2 port, DS-TT port management information (FWD, etc.), NW-TT port, NW-TT port management information (FWD, etc.)) is performed. At operation 1802-4, the SMF 1817 transmits bridge management configuration information to a DS-TT2/UE2 1813 and an NW-TT/UPF 1815 by using the PDU session modification process.

At operation 1802-5, the TSN AF 1820 retrieves port management information from the CNC 1822. At operation 1802-5, the TSN AF 1820 receives the port management information from the CNC 1822. Herein, the port management information includes scheduling information of each port.

At operation 1802-6-1, an AF request procedure (DS-TT1 port) is performed. At operation 1802-6-1, the TSN AF 1820 transmits port management information regarding the DS-TT2/UE2 1813 to the PCF 1818.

At operation 1802-6-2, an AF-NEF request (NW-TT ports) (all) is performed. At operation 1802-6-2, the TSN AF 1820 transmits port management information regarding the NW-TT/UPF 1815 to the NEF 1819. In this case, NW-TT/UPF 1815-relevant information may include a PDU session independency indication. In this case, if the information is the same as information already transmitted, the transmission may be omitted. If the transmission is omitted, subsequent operations 1802-7-2 and 1802-8-2 may be omitted.

At operation 1802-7-1, policy updating is performed. At operation 1802-7-1, the PCF 1818 transmits port management information to the SMF 1817.

The NEF 1819 performs selection and an operation at the next operation is changed.

At operation 1802-7-2, an NEF (-PCF)-SMF update procedure (NW-TT ports) (all) is performed. At operation 1802-7-2, the NEF 1819 transmits port management information regarding the NW-TT/UPF 1815 to the SMF 1817. In this case, NW-TT/UPF 1815-relevant information may include a PDU session independency indication. In this case, if the information is the same as information already transmitted, the transmission may be omitted. If the transmission is omitted, subsequent operation 1802-8-2 may be omitted.

At operation 1802-8-1, PDU session modification for a PDU session for UE2 (DS-TT2 port management information (for example, scheduling, etc.)) is performed. At operation 1802-8-1, the SMF transmits port management information to the DS-TT2/UE2 1813 by using the PDU session modification procedure.

At operation 1802-8-2, N4 session modification (NW-TT port management information (for example, SCH, etc.)) is performed. At operation 1802-8-2, the SMF 1817 transmits port management information to the NW-TT/UPF 1815 by using the N4 session modification procedure.

Various embodiments of the disclosure may provide an apparatus and a method for transmitting bridge management information in a wireless communication system.

The effect achieved in the disclosure is not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a time sensitive networking application function (TSN AF) entity in a mobile communication system, the method comprising:
   receiving, from a session management function (SMF) entity, port management information including first device side TSN translator (DS-TT) related information and first DS-TT independent information, and bridge management information including second DS-TT related information and second DS-TT independent information, wherein a DS-TT port corresponds to a protocol data unit (PDU) session;
   generating a port management information container including the port management information and a bridge management information container including the bridge management information; and
   transmitting, to a centralized network controller (CNC) entity, the generated port management information container and the generated bridge management information container,
   wherein the first DS-TT independent information included in the generated port management information container and the second DS-TT independent information included in the generated bridge management information container are commonly managed for a plurality of PDU sessions.

2. The method of claim 1, wherein the second DS-TT related information included in the generated bridge management information container comprises a DS-TT port number for the PDU session.

3. The method of claim 1, wherein each information element included in the generated bridge management information container is classified as to whether the each information element is related to the PDU session.

4. The method of claim 1, wherein the port management information and the bridge management information are received from a user plane function (UPF) entity including a network side TSN translator (NW-TT) via the SMF entity.

5. The method of claim 2, wherein the DS-TT port number indicates the PDU session.

6. A time sensitive networking application function (TSN AF) entity in a wireless communication system, the TSN AF entity comprising:
   a transceiver configured to transmit or receive a signal; and
   at least one processor coupled with the transceiver and configured to:
   receive, from a session management function (SMF) entity, port management information including first device side TSN translator (DS-TT) related information and first DS-TT independent information, and bridge management information including second DS-TT related information and second DS-TT independent information, wherein a DS-TT port corresponds to a protocol data unit (PDU) session,
   generate a port management information container including the port management information and a bridge management information container including the bridge management information, and
   transmit, to a centralized network controller (CNC) entity, the generated port management information container and the generated bridge management information container, wherein the first DS-TT independent information included in the generated port management information container and the second DS-TT independent information included in the generated bridge management information container are commonly managed for a plurality of PDU sessions.

7. The TSN AF entity of claim 6, wherein the second DS-TT related information included in the generated bridge management information container comprises a DS-TT port number for the PDU session.

8. The TSN AF entity of claim 6, wherein each information element included in the generated bridge management information container is classified as to whether the each information element is related to the PDU session.

9. The TSN AF entity of claim 6, wherein the port management information and the bridge management information are received from a user plane function (UPF) entity including a network side TSN translator (NW-TT) via the SMF entity.

10. The TSN AF entity of claim 7, wherein the DS-TT port number indicates the PDU session.

\* \* \* \* \*